(12) United States Patent
Hemstock

(10) Patent No.: US 9,938,812 B2
(45) Date of Patent: Apr. 10, 2018

(54) DESANDING APPARATUS AND A METHOD OF USING SAME

(71) Applicant: SPECIALIZED DESANDERS INC., Calgary (CA)

(72) Inventor: Christopher Hemstock, Calgary (CA)

(73) Assignee: Specialized Desanders Inc., Calgary (CA)

(*) Notice: Subject to any disclaimer, the term of this patent is extended or adjusted under 35 U.S.C. 154(b) by 159 days.

(21) Appl. No.: 14/566,849

(22) Filed: Dec. 11, 2014

(65) Prior Publication Data

US 2015/0090122 A1 Apr. 2, 2015

Related U.S. Application Data

(63) Continuation-in-part of application No. 13/372,291, filed on Feb. 13, 2012, now Pat. No. 8,945,256.
(Continued)

(51) Int. Cl.
*E21B 43/34* (2006.01)
*B01D 45/02* (2006.01)
(Continued)

(52) U.S. Cl.
CPC .......... *E21B 43/34* (2013.01); *B01D 19/0042* (2013.01); *B01D 21/0003* (2013.01);
(Continued)

(58) Field of Classification Search
CPC ............ B01D 19/0042; B01D 21/2405; B01D 21/2494; B01D 21/2483; B01D 21/0003; B01D 47/02; B01D 2221/04; B01D 45/02; B01D 35/30; B01D 21/0042; B01D 21/2416; E21B 27/00; E21B 43/34; C02F 2001/007
See application file for complete search history.

(56) References Cited

U.S. PATENT DOCUMENTS 1,494,670 A 5/1924 Delaney
1,535,721 A 4/1925 Gill
(Continued)

FOREIGN PATENT DOCUMENTS

CA 2041479 4/1998
CA 2433741 7/2003
(Continued)

OTHER PUBLICATIONS

PCT/CA2012/050915—International Search Report.
(Continued)

*Primary Examiner* — Dung H Bui
(74) *Attorney, Agent, or Firm* — Parlee McLaws LLP (CGY); Sean Goodwin

(57) ABSTRACT

An apparatus and method for removing particulates from a multiple-phase fluid stream is disclosed. The apparatus comprises a treatment chamber having a fluid inlet for receiving the multiple-phase fluid stream. The apparatus also comprises a recovery chamber having a gas channel and a liquid channel in fluid communication with the treatment chamber at a gas and a liquid port, respectively. The gas and liquid channels converge at an intake port of a fluid outlet for discharging particulate-removed gas and liquid.

18 Claims, 19 Drawing Sheets

Related U.S. Application Data

(60) Provisional application No. 62/087,604, filed on Dec. 4, 2014.

(51) Int. Cl.
  B01D 21/24 (2006.01)
  B01D 19/00 (2006.01)
  B01D 21/00 (2006.01)
  B01D 35/30 (2006.01)
  C02F 1/00 (2006.01)

(52) U.S. Cl.
  CPC ..... B01D 21/2405 (2013.01); B01D 21/2483 (2013.01); B01D 21/2494 (2013.01); B01D 45/02 (2013.01); B01D 21/0042 (2013.01); B01D 21/2416 (2013.01); B01D 35/30 (2013.01); B01D 2221/04 (2013.01); C02F 2001/007 (2013.01)

(56) References Cited

U.S. PATENT DOCUMENTS

| | | |
|---|---|---|
| 1,601,611 A | 9/1926 | Downey |
| 1,702,612 A | 2/1929 | Morse |
| 1,851,030 A | 3/1932 | Adams |
| 2,049,068 A | 7/1936 | Loupe |
| 2,058,044 A | 10/1936 | Spencer |
| 2,206,835 A | 7/1940 | Combs |
| 2,228,401 A | 1/1941 | Pressler |
| 2,547,190 A | 4/1951 | Wilson |
| 2,610,697 A | 9/1952 | Lovelady |
| 2,664,963 A | 1/1954 | Lovelady |
| 2,706,531 A | 4/1955 | Lovelady |
| 2,751,998 A | 6/1956 | Glasgow |
| 3,255,571 A | 6/1966 | Walker et al. |
| 3,273,318 A | 9/1966 | Meyer |
| 3,310,109 A | 3/1967 | Marx |
| 3,331,188 A | 7/1967 | Sinex |
| 3,349,547 A * | 10/1967 | Hoipkemeier ......... B01D 47/00 210/342 |
| 3,396,512 A | 8/1968 | McMinn |
| 3,426,904 A | 2/1969 | Katsua |
| 3,553,940 A | 1/1971 | Piner, Jr. |
| 3,574,096 A | 4/1971 | Carlstedt |
| 3,852,192 A | 12/1974 | Fassell |
| 4,073,734 A | 2/1978 | Lowrie |
| 4,115,279 A | 9/1978 | Toft |
| 4,122,009 A | 10/1978 | Tao |
| 4,208,196 A | 6/1980 | Coggins |
| 4,238,333 A | 12/1980 | Tidwell |
| 4,257,895 A | 3/1981 | Murdock |
| 4,400,271 A | 8/1983 | Lunceford |
| 4,539,023 A | 9/1985 | Boley |
| 4,604,196 A | 8/1986 | Lowrie et al. |
| 4,617,031 A | 10/1986 | Suh |
| 4,673,500 A | 6/1987 | Hoofnagle et al. |
| 4,721,565 A | 1/1988 | Carroll |
| 4,778,494 A | 10/1988 | Patterson |
| 4,939,817 A | 7/1990 | Weber |
| 4,975,205 A | 12/1990 | Sloan |
| 5,064,448 A | 11/1991 | Choi |
| 5,173,194 A | 12/1992 | Hering |
| 5,245,057 A | 9/1993 | Shirtum |
| 5,295,537 A | 3/1994 | Trainer |
| 5,326,474 A | 7/1994 | Adams et al. |
| 5,415,776 A | 5/1995 | Homan |
| 5,500,039 A | 3/1996 | Mori |
| 5,522,999 A | 6/1996 | Broussard |
| 5,575,909 A | 11/1996 | Foster |
| 5,582,271 A | 12/1996 | Mielo |
| 5,599,507 A | 2/1997 | Shaw |
| 5,827,357 A | 10/1998 | Farion |
| 5,865,992 A | 2/1999 | Edmondson |
| 5,900,137 A | 5/1999 | Homan |
| 5,928,519 A | 7/1999 | Homan |
| 6,099,743 A | 8/2000 | Pedersen |
| 6,110,383 A * | 8/2000 | Coombs ................. B01D 17/00 210/119 |
| 6,119,779 A | 9/2000 | Gipson et al. |
| 6,158,512 A | 12/2000 | Unsgaard |
| 6,189,617 B1 | 2/2001 | Sorhus et al. |
| 6,214,092 B1 | 4/2001 | Odom et al. |
| 6,214,220 B1 | 4/2001 | Favret |
| 6,269,880 B1 | 8/2001 | Landry |
| 6,409,808 B1 | 6/2002 | Chamberlain |
| 6,419,730 B1 | 7/2002 | Chavez |
| 6,458,191 B1 | 10/2002 | Lingelem |
| 6,537,458 B1 | 3/2003 | Polderman |
| 6,783,683 B2 | 8/2004 | Collings |
| 6,821,322 B2 | 11/2004 | Milia |
| 6,983,852 B2 | 1/2006 | Hemstock et al. |
| 7,429,332 B2 | 9/2008 | Surjaatmadja et al. |
| 7,614,389 B2 | 11/2009 | Ruckwied |
| 7,785,400 B1 | 8/2010 | Worley |
| 8,308,959 B2 | 11/2012 | Noles, Jr. |
| 8,337,603 B2 | 12/2012 | Akhras et al. |
| 8,623,221 B1 | 1/2014 | Boyd et al. |
| 8,784,670 B2 | 7/2014 | Zylla |
| 9,089,792 B2 | 7/2015 | Zylla |
| 2002/0162806 A1 | 11/2002 | Komistek |
| 2004/0074838 A1 | 4/2004 | Hemstock et al. |
| 2004/0184976 A1 | 9/2004 | Pagani |
| 2005/0247642 A1* | 11/2005 | Schenk .............. B01D 21/0024 210/744 |
| 2011/0078987 A1 | 4/2011 | Shishov et al. |
| 2011/0199855 A1 | 8/2011 | Hanada |

FOREIGN PATENT DOCUMENTS

| | | |
|---|---|---|
| CA | 2407554 | 4/2004 |
| CA | 2646150 | 6/2009 |
| CA | 2799278 | 8/2013 |
| EP | 0208981 B1 | 3/1991 |
| GB | 773096 | 4/1957 |
| GB | 1048873 | 11/1966 |
| JP | 2005-074362 | 3/2003 |
| JP | 2012-139681 | 12/2012 |
| WO | 2002063231 | 8/2002 |
| WO | 2002070101 | 9/2002 |
| WO | 2009055291 | 4/2009 |
| WO | 2010034325 | 4/2010 |
| WO | 2013016952 | 2/2013 |
| WO | WO 2015/089652 A1 | 6/2015 |

OTHER PUBLICATIONS

PCT/CA2014/051170 International Search Report and Written Opinion.
PCT/CA2014/050712 International Search Report and Written Opinion.
PCT/CA2015/051266 International Search Report and Written Opinion.
High Pressure Sand Trap, J.W. Williams Inc., 1 page, available prior to Feb. 2012.
JP,2005-0743862,A—English Translation, Japanese Patent Office.
JP,2012-139681,A—English Translation, Japanese Patent Office.

* cited by examiner

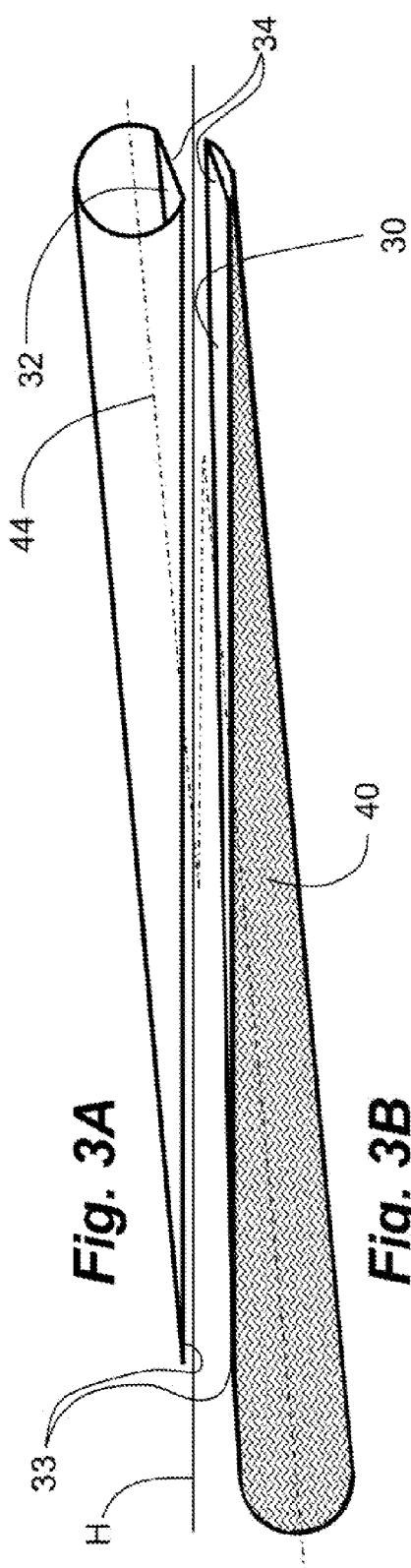
Fig. 3A
Fig. 3B
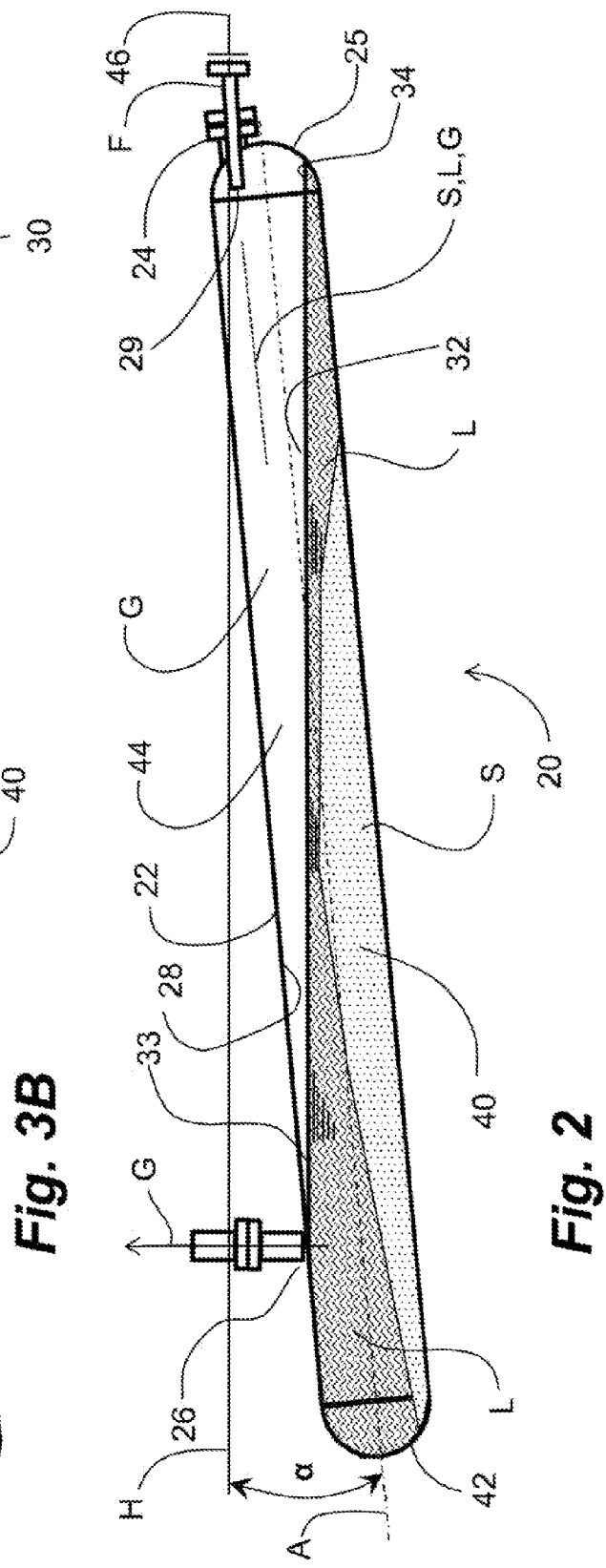
Fig. 2

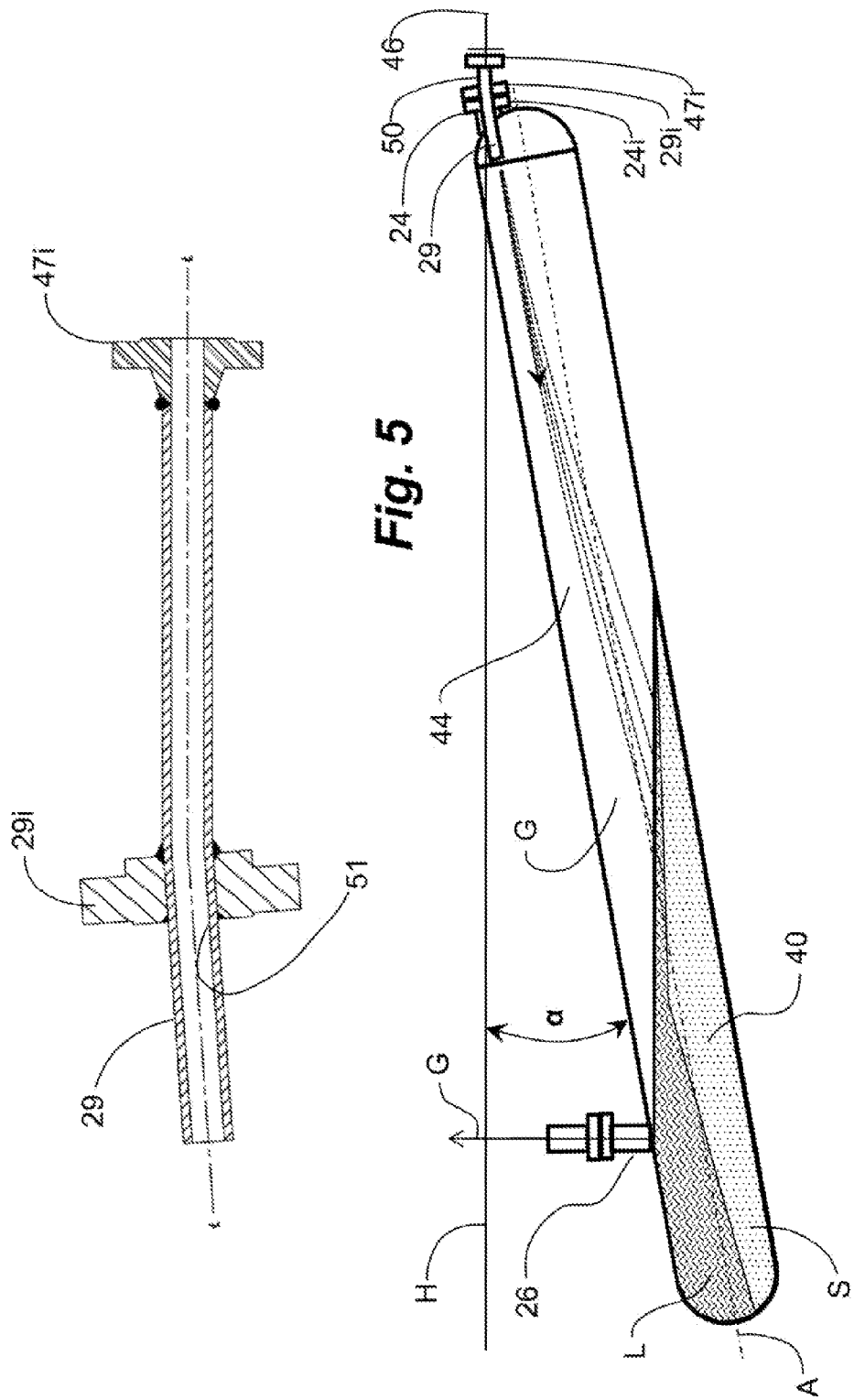

DESANDING APPARATUS AND A METHOD OF USING SAME

CROSS-REFERENCE TO RELATED APPLICATION

This application is a continuation-in-part of pending U.S. patent application Ser. No. 13/372,291, filed on Feb. 13, 2012, and published as US 2013/0206007 on Aug. 15, 2013, the content of which is incorporated herein by reference in its entirety. Further, this application claims priority of U.S. provisional patent application Ser. No. 62/087,604, filed on Dec. 4, 2014, the content of which is incorporated herein by reference in its entirety.

FIELD

The present disclosure generally relates to an apparatus and a method for removing particulates from multiphase fluid streams, and in particular, relates to an apparatus and a method for removing sands from multiphase fluid streams produced from an oil or gas well while minimizing the abrasion to the equipment involved.

BACKGROUND

Production from wells in the oil and gas industry often contains particulates such as sand. These particulates could be part of the formation from which the hydrocarbon is being produced, introduced from hydraulic fracturing, or fluid loss material from drilling mud or fracturing fluids, or from a phase change of produced hydrocarbons caused by changing conditions at the wellbore (Asphalt or wax formation). As the particulates are produced, problems occur due to abrasion and plugging of production equipment. In a typical startup after stimulating a well by fracturing, the stimulated well may produce sand until the well has stabilized, often lasting for several months after production commences. Other wells may produce sand for a much longer period of time.

Erosion of the production equipment is severe enough to cause catastrophic failure. High fluid stream velocities are typical and are even purposefully designed for elutriating particles up the well and to the surface. An erosive failure of this nature can become a serious safety and environmental issue for the well operator. A failure such as a breach of high pressure piping or equipment releases uncontrolled high velocity flow of fluid which is hazardous to service personnel. Releasing such fluid to the environment is damaging to the environment resulting in expensive cleanup and loss of production. Repair costs are also high.

In all cases, retention of particulates contaminates surface equipment and the produced fluids and impairs the normal operation of the oil and gas gathering systems and process facilities. Therefore, desanding devices are required for removing sand from the fluid stream. Due to the nature of the gases handled, including pressure and toxicity, all vessels and pressure piping in desanding devices must be manufactured and approved by appropriate boiler and pressure vessel safety authorities.

In one existing system, a pressurized tank ("P-Tank") is placed on the wellsite and the well is allowed to produce fluid and particulates. The fluid stream is produced from a wellhead and into a P-Tank until sand production ceases. The large size of the P-Tank usually restricts the maximum operating pressure of the vessel to something in the order of 1,000-2,100 kPa. In the case of a gas well, this requires some pressure control to be placed on the well to protect the P-Tank. Further, for a gas well, a pressure reduction usually is associated with an increase in gas velocity which in turn makes sand-laden wellhead effluent much more abrasive and places the pressure controlling choke at risk of failure. Another problem associated with this type of desanding technique is that it is only a temporary solution. If the well continues to make sand, the solution becomes prohibitively expensive. In most situations with this kind of temporary solution, the gas vapors are not conserved and sold as a commercial product.

Another known system includes employing filters to remove particulates. A common design is to have a number of fiber-mesh filter bags placed inside a pressure vessel. The density of the filter bag fiber-mesh is matched to the anticipated size of the particulates. Filter bags are generally not effective in the removal of particulates in a multiphase condition. Usually multiphase flow in the oil and gas operations is unstable. Large slugs of fluid followed by a gas mist are common. In these cases, the fiber bags become a cause of pressure drop and often fail due to the liquid flow there through. Due to the high chance of failure, filter bags may not be trusted to remove particulates in critical applications or where the flow parameters of a well are unknown. An additional problem with filter bags in most jurisdictions is the cost associated with disposal. The fiber-mesh filter bags are considered to be contaminated with hydrocarbons and must be disposed of in accordance to local environmental regulation.

Hydrocylone or cyclone devices are also known for separating particles from liquid mixture by exploiting the centripetal force. By injecting the liquid mixture into a vessel and spinning therein, heavy or large particles move outward towards the wall of the vessel due to the centripetal force, and spirally move down to the bottom of the vessel. Light components move towards the center of the vessel and may be discharged via an outlet. However, Hydrocylone devices have difficulty in separating particulates from effluents with more than two phases, and have an associated pressure drop issue that is undesirable in many oilfield situations.

In Canadian Patent Number 2,433,741, issued Feb. 3, 2004, and in Canadian Patent Number 2,407,554, issued Jun. 20, 2006, both assigned to the Applicant of the subject patent application, a desander is disclosed having an elongate, horizontal vessel with an inlet at one end and an outlet at the other end. The fluid inlet is adapted for connection to a fluid stream F, which typically comprises a variety of phases including gas G, some liquid L and entrained particulates P such as sand. The fluid stream F containing particulates P enters through the inlet end and is received by a freeboard portion. The freeboard area is set by a downcomer flow barrier, or a weir. Accordingly, the velocity of the fluid stream F slows to a point below the entrainment or elutriation velocity of at least a portion of the particulates P in the fluid stream. Given sufficient horizontal distance without interference, the particulates P eventually fall from the freeboard portion. Particulates P and liquids L accumulate over time in a belly portion under the freeboard portion, and the desanded fluid stream, typically liquid L and gas G, emanates from the fluid outlet.

The accumulated particulates in the vessel require periodical cleanout at sufficient intervals to ensure that the maximum accumulated depth does not encroach on the fluid outlet. However, for larger vessels, manual cleaning becomes difficult and time consuming.

Therefore, there continues to exist the desire of further improving capacity, separation efficiency and the ease with which the vessel with can be cleaned.

SUMMARY

It is an objective of this disclosure to provide a desanding device for removing particulates from a fluid stream.

According to one aspect, there is provided a desanding device for removing at least particulates from a multiple-phase fluid stream containing at least gas and entrained particulates. The desanding device comprises: a vessel forming a treatment chamber, the treatment chamber having a fluid inlet for receiving the fluid stream; a recovery chamber having a first upper port in fluid communication with an upper portion of the treatment chamber for receiving gas therefrom, a second lower port in fluid communication with a lower portion of treatment chamber, and a fluid outlet intermediate the first and second ports for discharging at least particulate-removed gas out of the treatment chamber.

In one embodiment, the recovery chamber is external to the vessel.

In another embodiment, the recovery chamber is a conduit and fluidly connected to the treatment chamber within the vessel at the first port and at the second port.

In another embodiment, the recovery chamber is located within the vessel and fluidly connected to the treatment chamber at the first port and at the second port.

In another embodiment, the treatment chamber further comprises a particulate drain for removing particulate from said treatment chamber.

In another embodiment, the fluid outlet is at an elevation lower than the fluid inlet.

In another embodiment, the cross-sectional areas of the recovery chamber is much smaller than the cross-sectional area of the treatment chamber.

In another embodiment, the fluid stream further comprises liquid, and wherein the recovery chamber receives liquid through the second port.

In another embodiment, the fluid stream further comprises liquid, and wherein a liquid interface is formed in the recovery chamber and treatment chamber at the elevation of the fluid outlet.

In another embodiment, the treatment chamber further comprises a flow barrier between the fluid inlet and the first port for directing the fluid stream thereabout.

In another embodiment, a first portion of the recovery chamber is external to the vessel and a second portion of the recovery chamber is located within the vessel.

According to another aspect, there is provided a method of removing at least particulates from a multiple-phase fluid stream containing at least gas and entrained particulates. The method comprises: establishing a treatment chamber; establishing a first channel between the treatment chamber and a fluid outlet for directing particulate-removed gas from the treatment chamber to the fluid outlet through the first channel; establishing a second channel between the treatment chamber and the fluid outlet; injecting said fluid stream into the treatment chamber to allow at least a substantial amount of the entrained particulates fall out of the fluid stream and move into a lower portion of the treatment chamber; and discharging the particulate-removed gas via the fluid outlet.

In one embodiment, the method further comprises: discharging particulates accumulated in the lower portion of the treatment chamber via a particulate drain.

In another embodiment, the fluid stream also comprises fluid, and the method further comprises: directing liquid from the treatment chamber to the fluid outlet through the second channel.

In one embodiment, said establishing a treatment chamber further comprises: establishing the treatment chamber in a vessel.

In one embodiment, said establishing a first channel further comprises: establishing the first channel in a first conduit external to the vessel.

In one embodiment, said establishing a second channel further comprises: establishing the second channel in a second conduit external to the vessel.

In one embodiment, said first conduit and second conduit are a first portion and a second portion of a same conduit.

In one embodiment, said establishing a first channel further comprises: establishing the first channel in the vessel, said first channel being separated from the treatment chamber.

In one embodiment, said establishing a second channel further comprises: establishing the second channel in the vessel, said second channel being separated from the treatment chamber.

In one embodiment, the first and second channels are separated from the treatment chamber by a baffle.

According to another aspect, a desanding apparatus is provided which is placed adjacent to a well's wellhead for intercepting a fluid stream flow before prior to entry to equipment including piping, separators, valves, chokes and downstream equipment. The fluid stream can contain a variety of phases including liquid, gas and solids. In one embodiment, a pressure vessel is inserted in the flowstream by insertion into high velocity field piping extending from the wellhead. The vessel contains an upper freeboard portion having a cross-sectional area which is greater that of the field piping from whence the fluid stream emanates. As a result, fluid stream velocity drops and particulates cannot be maintained in suspension. The freeboard portion is maintained through control of the angle of the desander, obviating the need for a downcomer of Applicant's own prior art horizontal desanders.

According to another aspect, a desanding system receives a gas stream containing entrained liquid and particulates. The system comprises a vessel, elongated along a longitudinal axis and inclined from a horizontal at a non-zero inclination angle. The vessel has a fluid inlet, adjacent an upper end for discharging the gas stream into the vessel at an inlet velocity, and a fluid outlet, spaced along the longitudinal axis from, and lower than, the fluid inlet.

The vessel further has a gas/liquid interface at the fluid outlet, a belly storage portion formed below the interface, and a freeboard portion formed adjacent an upper portion of the vessel above the interface. The freeboard portion has a freeboard cross-sectional area which diminishes from the fluid inlet to the fluid outlet, wherein a freeboard velocity, adjacent the fluid inlet is less than the inlet velocity, the freeboard velocity being such that the entrained liquids and particulates fall out of the gas stream for collecting in the belly storage portion. A desanded gas stream flows out of the freeboard portion and out the fluid outlet, being free of a substantial portion of the particulates.

More preferably, a vessel of an embodiment of the present invention is incorporated in a desanding system to replace existing prior connective piping for a wellhead, the vessel being supported using structure to align the vessel with the wellhead piping and downstream equipment. The desander's fluid inlet and fluid outlet, associated with the inclined world of the desander, are adapted to connect to the orthogonal world of the connective piping.

According to another aspect, a method for desanding a fluid stream, emanating from a wellhead and containing gas and entrained liquid and particulates, comprises providing an elongated vessel having a longitudinal axis which is inclined from the horizontal. The vessel has a fluid inlet adjacent an first end of the vessel and a fluid outlet spaced along the longitudinal axis from the fluid inlet; inclining the vessel at angle from a horizontal at a non-zero inclination angle so that the fluid outlet is lower that the fluid inlet for forming a freeboard portion above the fluid outlet. The fluid stream is discharging from the fluid inlet, into the vessel and substantially parallel to the longitudinal axis for establishing a liquid interface in a belly portion of the vessel, the belly portion and being formed below the fluid outlet. Liquid and particulates are being directed along a trajectory in the freeboard portion of the vessel to intercept a substantial portion of the particulates at the liquid interface for storage in the belly portion. A desanded gas stream is recovered at the fluid outlet which is substantially free of particulates.

The inlet can be parallel or non-parallel with the longitudinal axis for enabling a trajectory to intercept the gas/liquid interface. The fluid stream can be introduced through a replaceable nozzle. The fluid inlet can be curved to align the inlet from the inclined desander and orthogonal piping from a wellhead.

BRIEF DESCRIPTION OF THE DRAWINGS

FIG. 2 is a cross-sectional view of an embodiment of a tilted or inclined desander;

FIGS. 3A and 3B are perspective representations of the volumes of the belly portion and freeboard portions of the inclined desander of FIG. 2;

FIG. 4 is a cross-sectional view of another embodiment of an inclined desander having a greater inclination angle than that of FIG. 2;

FIG. 5 is a cross sectional view of a curved fluid inlet, square to the desander, and having a long radius angular transition elbow between orthogonal piping and the inclined desander;

DETAILED DESCRIPTION

A desanding device is typically inserted between, or as a replacement for, existing piping such as connecting piping coupled to a wellhead and downstream equipment such as piping, valves, chokes, multiphase separators and other downstream equipment.

Figure 1:
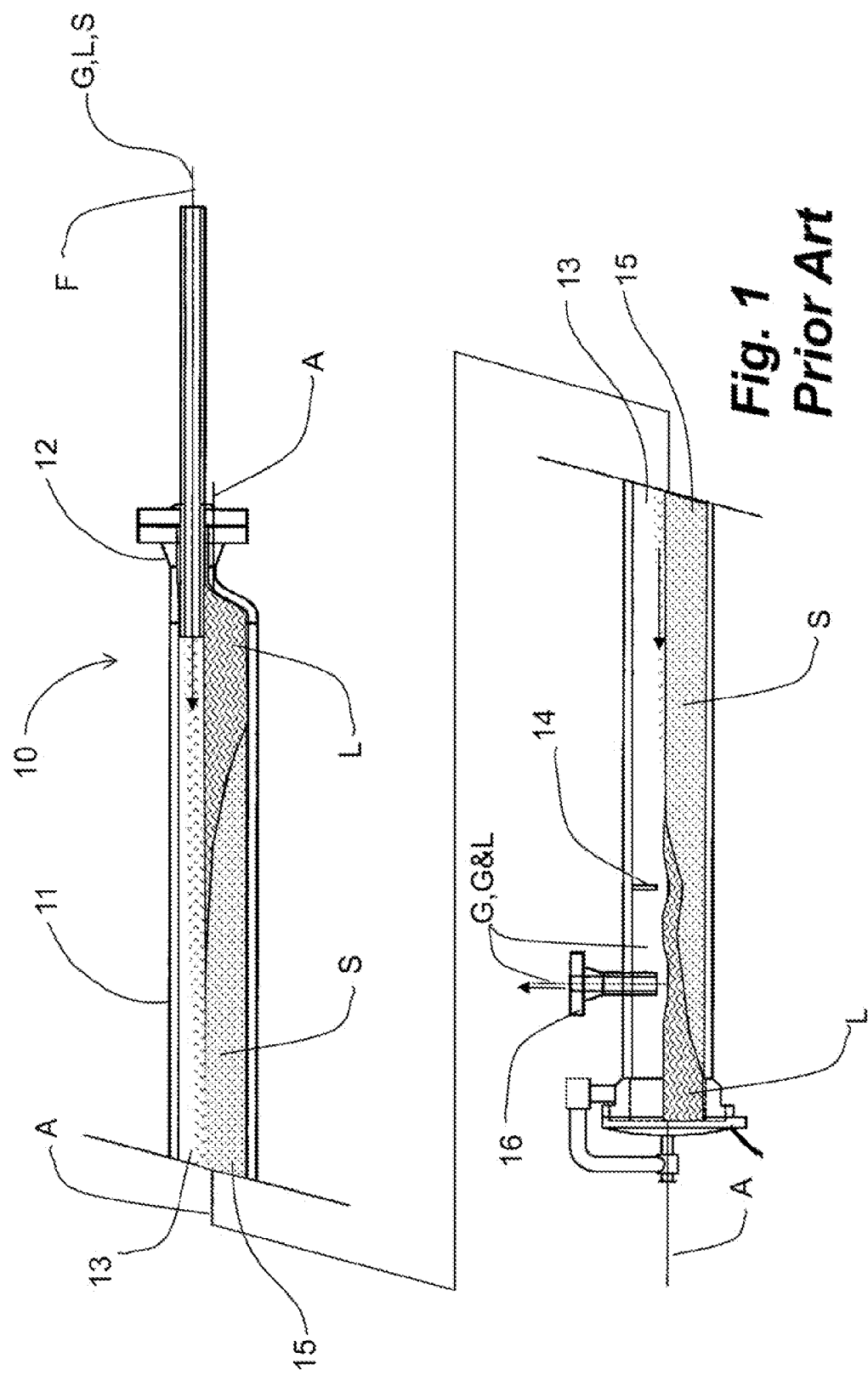
FIG. 1 is a cross-sectional side view of Applicant's prior art elongated horizontal desander illustrating downcomer flow barrier, fluid streams, falling trajectory of particulates, and accumulations of separated liquid, particulates and particulate-free fluid discharge.

As shown in FIG. 1, a prior art horizontal desander comprises a cylindrical pressure vessel 11 having a substantially horizontal axis A, a first fluid inlet end 12 adapted for connection to the fluid stream F. The fluid stream F typically comprises a variety of phases including gas G, some liquid L and entrained particulates such as sand S. The fluid stream F containing sand S enters through the inlet end 12 and is received by a freeboard portion 13. In the illustrated prior art vessel, the freeboard area is set by a downcomer flow barrier 14. Accordingly, the velocity of the fluid stream F slows to a point below the entrainment or elutriation velocity of at least a portion of the particulates S in the fluid stream. Given sufficient horizontal distance without interference, the particulates S eventually fall from the freeboard portion 13. Particulates S and liquids L accumulate over time in the belly portion 15 and are periodically cleaned out at sufficient intervals to ensure that the maximum accumulated depth does not encroach on the freeboard portion 13. The desanded fluid stream, typically liquid L and gas G, emanates from fluid outlet 16.

As shown in FIGS. 2 through 7, embodiments of an inclined desander 20 are free of the prior art flow barrier and, through tilting or inclination of the vessel, maximize freeboard upon entry of the flow stream, and reduce liquid flow rates for maximizing settling conditions therein and retention of captured particulates S. Variability of the inclination angle α enables a measure of variability between the respective freeboard and liquid-storing belly portion for adjusting performance.

As shown in FIG. 2, the desander 20 comprises a vessel 22 having an axis A oriented at an angle α to the horizontal H. The desander 20 has a fluid inlet 24 at an upper end 25 for receiving a fluid stream F typically comprising a variety of phases including gas G, some liquid L and entrained particulates such as sand S. In this embodiment, the fluid inlet 24 is oriented parallel to a longitudinal axis A of the vessel 22. A fluid outlet 26 is located along a top 28 of the vessel 22, and spaced from the fluid inlet 24. In an operating state, a gas/liquid interface 32 forms extending horizontally from about the fluid outlet 26. A belly portion 40 is formed below the interface 32 for containing liquid L and particulates S. A freeboard portion 44 is formed above the interface 32. The fluid inlet 24 discharges into the freeboard 44. Particulate trajectory can be manipulated by positioning and orienting a discharge end 29 of the fluid inlet 24. In one embodiment, the discharge 29 of the inlet 24 can be aligned parallel to the vessel axis A. The inlet 24 or discharge 29 can be oriented in other orientations including above the inclined axis A, or below the axis A.

The interface 32 is a generally obround, gas/liquid interface between the belly and freeboard portions 40, 44. The obround interface 32 has a distal end 33 adjacent the fluid outlet 26 and a proximal end 34, the location of which is intermediate the fluid outlet 26 and fluid inlet 24 and varies with liquid level and inclination angle α. As a result of the desander 20 inclination, the trajectory of the fluid stream F, from inlet 24, converges with the interface 32. The trajectory for dropping sand S and liquid L into the belly portion 40 is foreshortened, reducing drop out time. The vessel 22 is long enough to space the fluid inlet 24 sufficiently from the interface 32 to minimize turbulence of the liquid L in the belly portion 40, that spacing being dependent upon various design factors including vessel inclination angle α, inlet fluid stream velocity and characteristics.

At a steady state, the maximum level of the interface 32, is controlled at the distal end 33, set by eventual liquid entrainment and discharge at the fluid outlet 26. Gas G discharges at the fluid outlet 26. At steady state, when the liquid level reaches the fluid outlet 26, any oil and other liquids are re-entrained with the gas G exiting at fluid outlet 26. Particulates S continue to be captured in the belly portion 40 until its volumetric capacity is reached.

Connective piping 46, between conventional wellhead and downstream equipment, is typically in rectilinear or orthogonal arrangements. Thus, the angle α of the desander 20 introduces coupling or connection challenges. The connective piping 46 is generally horizontal or vertical and incorporation of the inclined desander 20 requires an adjustment made at the fluid inlet 24 and fluid outlet 26. In many scenarios, with a small inclination angle α, the fluid outlet 26 can be fit to the top 28 of the vessel 22 at angle α, orienting the outlet 26 vertically and thereby obviating the need for an angular transition.

Turning to FIGS. 3A and 3B, the desander 20 is shown diagrammatically split at the interface 32 for illustrating the incrementally increasing volume of the belly portion 40 below and the incrementally decreasing volume of freeboard portion 44, increasing and decreasing as referenced to the feed stream F. The freeboard portion 44 demonstrates a cross-sectional area which diminishes from the fluid inlet 24 to the fluid outlet 26. As shown in FIGS. 2 and 4, a freeboard velocity at the fluid inlet 24 is such that the entrained liquids L and particulates S fall out of the fluid stream F and collect in the storage belly portion 40. The cross-sectional area of the freeboard portion 44, adjacent the fluid inlet 24, is at its greatest for achieving the lowest average inlet velocity for maximum drop out efficiency for particulates S and liquids L. As the freeboard cross-sectional area adjacent the fluid inlet 24 is large and relatively unimpeded by the belly portion 40, the velocity reduction upon discharge is significantly greater than that of Applicant's prior art horizontal desander. Particulate removal is accomplished while minimizing the portion of the vessel allocated to the freeboard portion 44, maximizing the efficiency of that freeboard portion for particulate drop out, and resulting in a greater allocation of the overall portion of the vessel to the belly portion 40 for storage.

Velocity in the freeboard portion 44 increases after a substantial portion of the particulates S have already deposited in the belly portion 40. The cross-sectional area of the belly portion 40 increases towards the fluid outlet 26 and the velocity of liquids accumulating therein diminishes.

With reference again to FIG. 2 and to FIG. 4, in the belly portion, particulates accumulate and flow downvessel at an angle of repose. The accumulation of liquid L and particulates S establishes a downward flow in the belly portion, and as the particulates accumulate and limit the free flow of the liquid L in the belly portion 40, the liquid velocity begins to increase, drawing more particulates S downvessel.

With reference to FIG. 4, the inclination angle α can be adjusted, shown here as an increased angle over that of FIG. 2. At increasing angles α the trajectory of the feed stream impinges the interface 32 at less acute angle, impinges the interface 32 sooner and enables selection of shorter vessels 22 and greater particulate removal efficiency.

Inclination angles α can be adjusted, for a given length of vessel 22, between fluid inlet 24 and fluid outlet 26, to accommodate gas G and liquid L content in the feed fluid stream F. Inclination angles α would generally be in the range of about 2 degrees to about 20 degrees. The shallowest operating angle α is limited by the minimum requirement for a minimum freeboard 44 cross-sectional area adjacent the inlet 24 once the interface 32 builds to about the fluid outlet 26. The steepest operating angle α is limited by the requirement for a minimum storage capacity in the belly portion 40. The minimum inclination angle would be the condition where the inlet 24 is entirely in the gas phase of the freeboard portion 44 and the gas phase at the discharge is of zero height. The maximum inclination angle would be the condition where the inlet 24 is well above the gas/liquid interface allowing substantial freeboard to handle slug flow. Angles above 45 degrees limit the performance of desander considerably since the residence time of the liquid phase in the belly portion 40 is reduced.

With reference to FIGS. 4 and 5, the fluid inlet 24, exposed to entrained particulates S in the fluid stream, is subject to greatest risk of erosion. While the inlet 24 can be integrated with the vessel 22, one can also provide an inlet 24 or discharge 29 that is replaceable for ease of maintenance. Options include accepting eventual wear and shutdown of the desander 20 for replacement of an integrated inlet 24; modifying the material or configuration of the inlet 24 to prolong service life, or using replaceable discharge of nozzle for minimizing turnaround time. As stated, one approach is to make the discharge 29 replaceable including incorporating features of a replaceable nozzle as set forth in Applicant's Canadian Patent Number 2,535,215 issued May 8, 2008. A replaceable nozzle 50 can be fit to a compatible coupling at the upper end 25 of the vessel 22. One form of replaceable nozzle 50 comprises the discharge 29, and a threaded connection or nozzle flange 29i, for connection to a compatible threaded connection or flange 24i at the inlet 24 of the vessel 22. The orientation of the discharge is dependent on the coupling 24i, 29i and arrangement of the discharge relative thereto. The replaceable nozzle 50 includes a connecting piping coupling, such as a connective flange 47i for connecting to the piping 47.

To maximize service life, the nozzle 50 can incorporate a curved portion 51, such as a long radius elbow, transition between the orthogonal world of the connecting piping and the inclined axis A of the vessel 22. That curved portion 51 can be integrated with the inlet 24, nozzle 50 or located in advance thereof, such as in a transition pup joint.

In operation, various sizes are desanders are employed in the prior art for differing operational conditions. Prior art desanders 10, such as that described in U.S. Pat. No. 6,983,852 to Applicant, for different feed fluid streams F, might include one typical standard vessel 11 having a nominal 0.3 m (12 inch) diameter by 3.048 m (10 feet) long and another vessel 11 having 0.3 m (12 inch) diameter by 6.096 m (20 feet) long, both of which are fitted with a downcomer weir to set the freeboard portion.

Herein, in the inclined desander 20, the prior art downcomer flow barrier, such as a weir, can be eliminated by providing similar 0.3 m (12 inch) diameter vessels 22 and tilting the upper end 30 of the new desander 20 at about twice the prior art weir height so as to form the interface 32 at the fluid outlet 26. To mimic the minimum operating performance of the 3.048 m (10 feet) and 6.096 m (20 feet) prior art desanders, a 20 foot long inclined vessel 22 would only need to be inclined about ½ the angle α of the 10 foot long inclined vessel 22. Performance can be adjusted by varying the angle.

Figure 6:
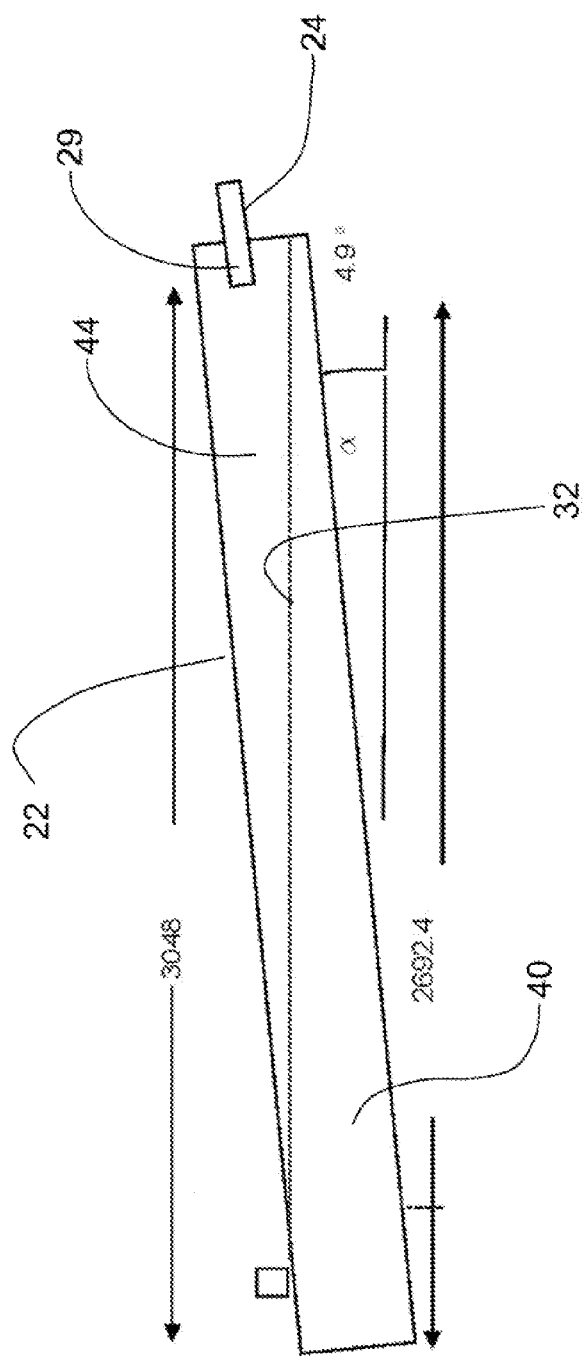
FIG. 6 is a representation of an inclined desander illustrating parameters for an example 12 inch diameter desander handling 50 m³/d of fluid flow.

As shown in FIG. 6, an example of an inclined desander 20 can receive a fluid stream F of 50 m$^3$/d, bearing particulates S having an average size of 150 um. The fluid stream F can be discharged to vessel 22, having a 0.3 m (1 foot) diameter and 3.048 m (10 feet) long. A typical pressure of the fluid stream F is about 7000 kPa (1015 psia). At an inclination angle α of 4.9 degrees, the freeboard volume is 0.10 m$^3$ and the belly portion is 0.486 m$^3$. The resulting belly portion capacity is about 502 kg of sand particulates.

Figure 7:
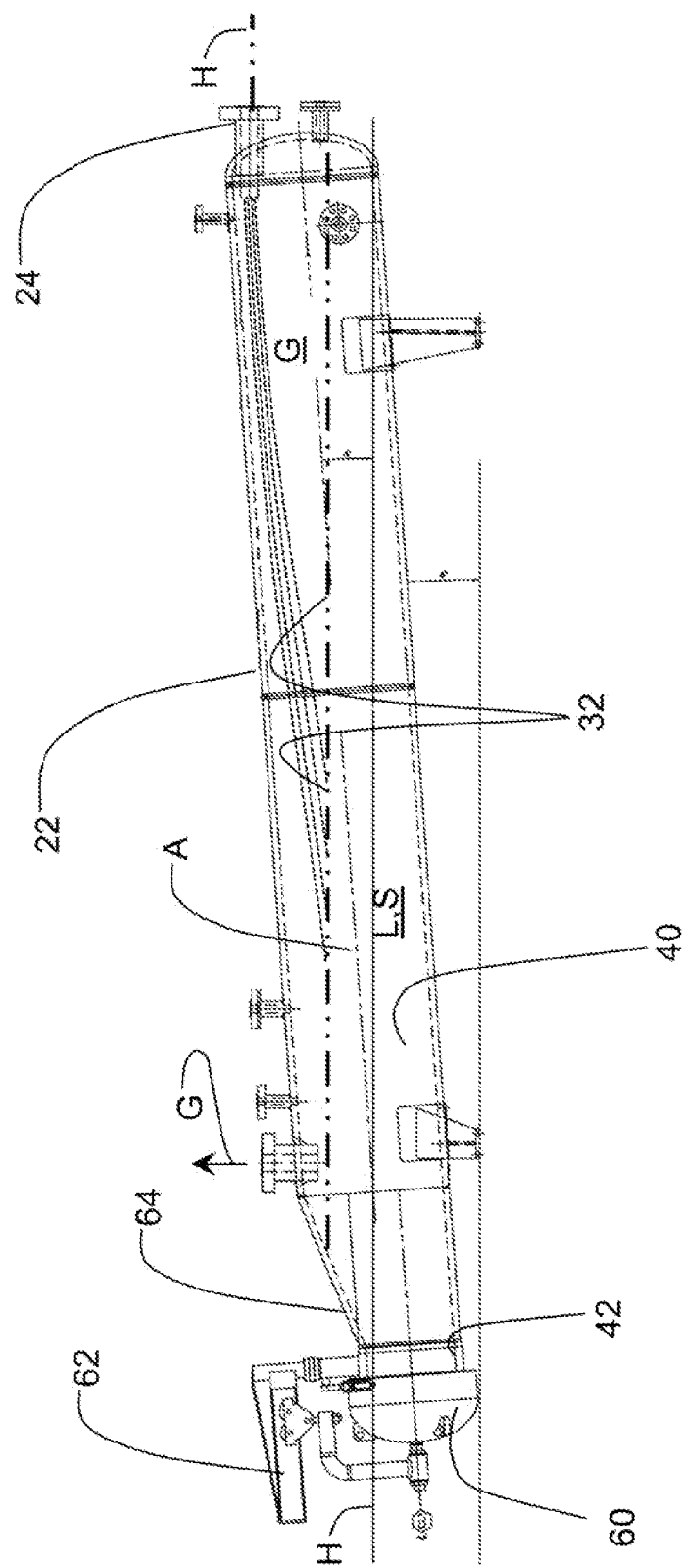
FIG. 7 is a representation of an inclined desander illustrating parameters for an example 36 inch diameter desander having a horizontal fluid inlet.

As shown in FIG. 7, another embodiment of an inclined desander 20 illustrates some additional optional characteristics including a fluid inlet 24 oriented horizontally, the inlet being directly connectable to orthogonal connection piping. The discharge 29 is oriented at an angle to the longitudinal axis A, in this case in a generally horizontal plane, which is angled upwardly from axis A. The initially horizontal trajectory of a substantial portion of the feed stream falls off before engaging the vessel 22. In part, the inlet 24 can be square to the connective pipe as, in this embodiment, the vessel 22 is of sufficient diameter, such as 36 inches, to permit inlet placement in the freeboard 44 while the trajectory is such that it minimizes or avoids vessel wall involvement. As shown, a horizontal spacing between the inlet 24 and inside wall of the vessel 22 is about 1.5 feet.

Removal of accumulated particulates is conducted periodically with the vessel 22 shut in, adjacent the inlet 24 and outlet 26, and depressurized. Conveniently, access can be through a pressure-rated access closure and port at the lower end 42, as the angle of repose and flow in the belly portion carries particulates thereto. A suitable closure is shown in FIG. 1 of the prior art and in FIG. 7 as adapted to the inclined desander 20. The vessel 22 is supported sufficiently high of the ground or otherwise positioned for angular access thereto, such as with scrapers and the like. A pressure vessel, hemispherical head-form of closure 60 can be pivoted from the vessel 22 and counterweighted to close flush to the inclined cylindrical end of the vessel 22. A gantry 62 assists in manipulation of the head for access to the belly portion 40.

Further, the illustrated vessel 22 includes an eccentric end 64 at the lower end 42, to reduce the diameter of the vessel 22 downstream of the fluid outlet 26. Advantages of reducing the vessel diameter at the lower end 42 include adapting to a smaller, more easily manageable or standard form of clean out. As shown the cleanout is a pressure-rated closure 60 supported upon gantry 62. In this embodiment, a 36 inch vessel, having 33 inch internal diameter, is inclined at 4 degrees. The cylindrical portion of the vessel is about 20 feet long with a 3 foot long eccentric portion, reducing the diameter from 3 to about 18 inches for fitting an 18 inch clean out.

Conventional pressure safety valves and other gas phase related devices and instrumentation, not shown, are reliably located in the freeboard portion 44 between the fluid outlet 26 and the upper end 25.

Persons skilled in the art appreciate that various alternative embodiments are possible. As will be described in more detail later, in an alternative embodiment, a desanding device comprises a vessel having a treatment chamber that comprises a fluid inlet, and a recovery chamber that comprises a fluid outlet. The treatment and recovery chambers are in fluid communication by an upper port and a lower port. The treatment chamber receives a multiple-phase fluid stream F therein and separates particulates from gas. Particulates and any liquid are collected in the treatment chamber. Particulate-free gas communicates with the recovery chamber via the upper port for recovery and is discharged at the fluid outlet. Particulate-free liquid, if any, communicates with the recovery chamber via the lower port for recovery and is discharged with the gas at the fluid outlet. A liquid interface, if any, will form at the elevation of the fluid outlet as particulate-free liquid is carried with the gas stream to downstream equipment. As the recovery chamber and treatment chamber are in fluid communication via the lower port, the liquid interface also forms in the treatment chamber. The liquid interfaces are at substantially the same elevation given the hydraulics of the chambers. The recovery chamber comprises a gas channel connected to the first upper port, and a liquid channel connected to the second lower port, converging at the fluid outlet.

The desanding device receives, via the fluid inlet, a multiphase fluid stream F from the wellhead, and injects the fluid stream F into the treatment chamber. Herein, in this embodiment, the multiphase fluid F typically comprises a variety of phases including gas G, some liquid L such as water and/or oil, and entrained particulates P such as sand.

The fluid stream F injected into the treatment chamber is directed to go along a downward path therein. Because of gravity, particulates P and liquid L fall out of the fluid stream F into the lower portion of the treatment chamber, so called an accumulator portion. As the lower portion of the treatment chamber has an inclination angle greater than the angle of repose of a bank of wet particulates, particulates P migrate from the treatment chamber down into a particulate collection structure. Liquid L is accumulated in the lower portion of the treatment chamber and particulates settle therefrom towards the particulate collection structure. The particulate-free liquid enters the liquid channel of the recovery chamber via the lower port.

Gas G traverses the upper portion of the treatment chamber, so called a freeboard portion, and enters the gas channel via the first upper port or gas port. As the liquid and gas channels are merged of converge at the fluid outlet, liquid and gas are recombined at the fluid outlet and are discharged to downstream equipment. The accumulator portion is separated from the freeboard portion by a freeboard interface referred to in industry as a gas/liquid interface, being an interface between gas G and liquid L.

Compared to the desander of FIGS. 1 to 7, the embodiments disclosed below have advantages including requiring less horizontal operational space and the provision of a large accumulator portion for reduced accumulator or storage velocities for enhanced settling therein and increased particulate storage as necessary.

Figure 8:
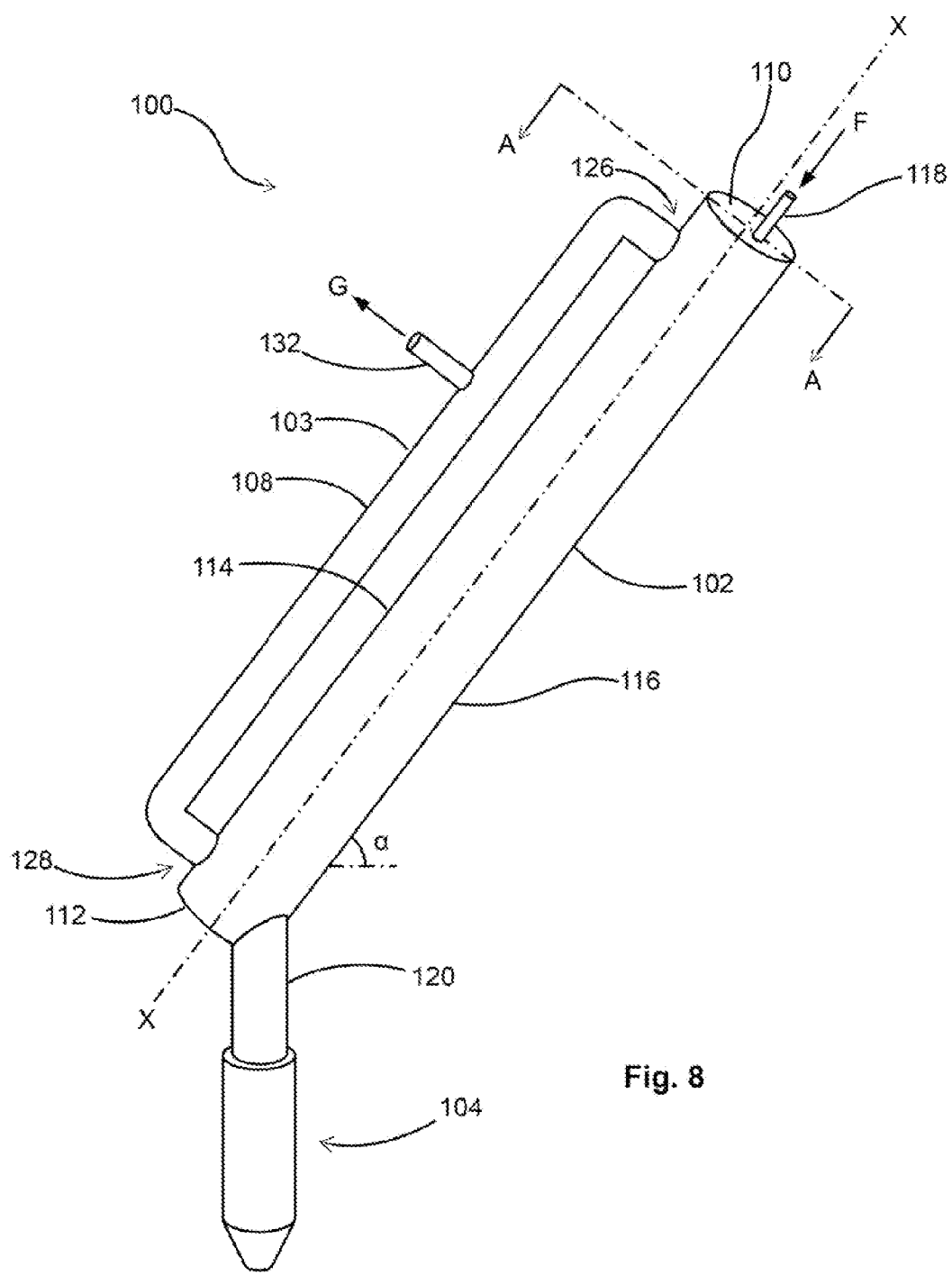
FIG. 8 is a perspective view of a desanding device according to one embodiment, the desanding device comprising an inclined vessel forming a treatment chamber, and an inclined conduit forming a recovery chamber having gas channel and a liquid channel both in fluid communication with the treatment chamber.
Figure 9:
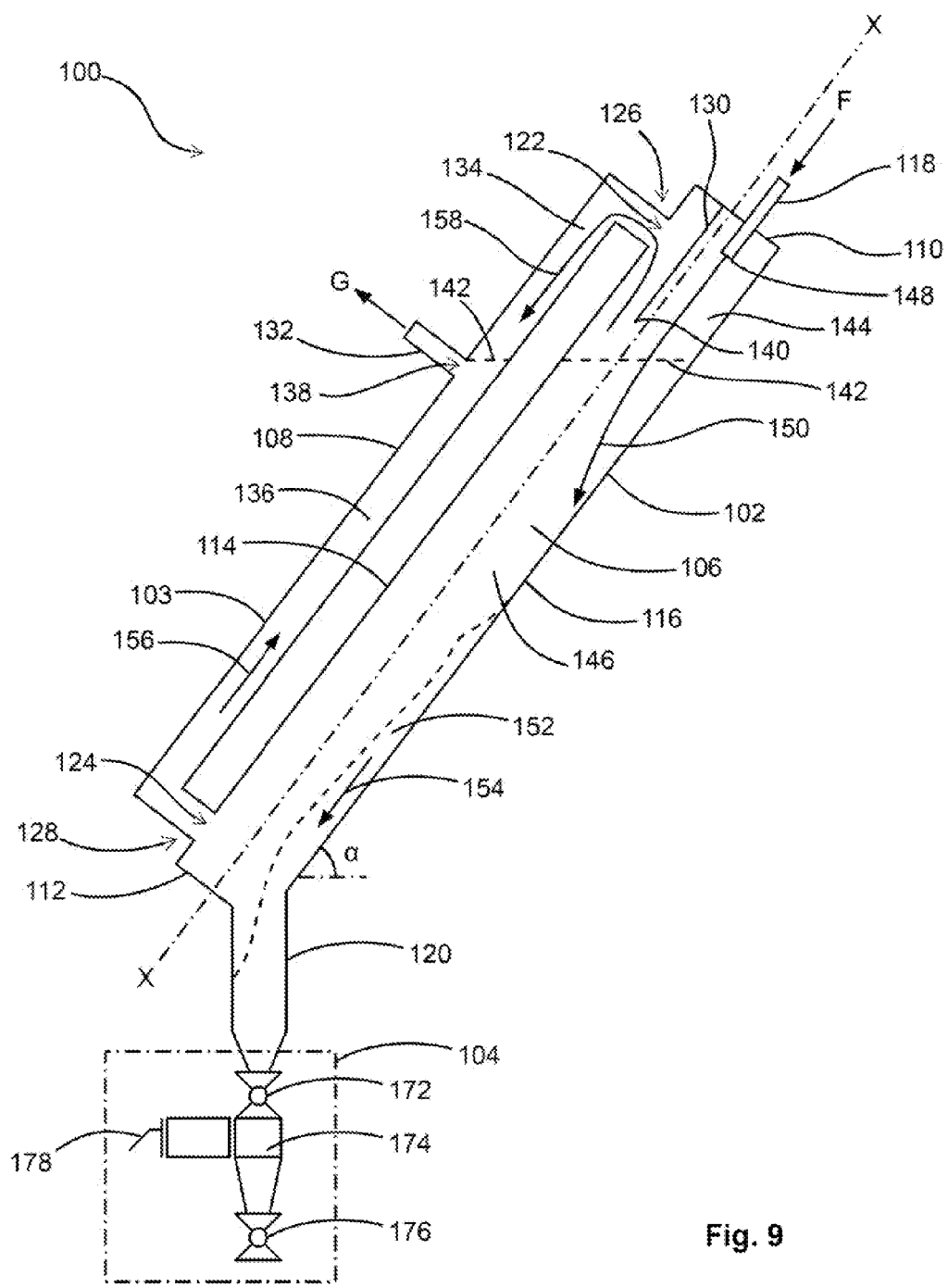
FIG. 9 is a cross-sectional view of the desanding device of FIG. 8 along section A-A.

With reference to FIGS. 8 and 9, in one embodiment, a desanding device 100 is presented for separating multiphase fluid stream injected therein. The desanding device 100 comprises a vessel 102 for receiving a multiphase fluid stream F. In this embodiment, the vessel 102 is an inclined, elongated cylindrical container with a volume sufficient for removing particulates from the fluid injected therein. In particular, the vessel 102 comprises a cylindrical bounding wall terminated at opposing upper and lower end walls 110 and 112. A portion of the bounding wall forms a top wall 114 and a portion thereof forms a bottom wall 116. In other words, the vessel 102 is a cylindrical vessel having top and bottom heads, typically hemispherical for pressure service, or suitable flat heads.

In this embodiment, the vessel 102 is inclined at a predefined angle α greater than the angle of repose of a bank of wet particulates. In one embodiment, the inclination angle α is between about 25° and about 90°. In another embodiment, the inclination angle α is between about 30° and about 90°.

In this embodiment, the entire vessel 102 forms a treatment chamber 106 for removing particulates from the multiple-phase fluid stream F injected therein. The vessel 102 comprises a fluid inlet 118 adjacent its upper end wall 110 oriented in a direction generally along the longitudinal axis X-X for receiving the multiphase fluid stream F, and a particulate drain 120 in proximity with its lower end 112 coupling to a particulate collection structure 104. A recovery chamber 103 is provided external and adjacent the vessel 102. The vessel 102 also comprises a first upper opening or port 122 and a second lower opening or port 124 along the top wall 114 for fluidly connecting with upper and lower ends 126, 128 respectively of the recovery chamber 103. The recovery chamber is an elongated conduit 108 positioned above the vessel 102 and generally parallel thereto. Where vessel 102 is a pressure vessel, then conduit 108, upper port 126 and lower port 128 are also pressure rated, such as using the appropriate pipe and fittings.

The recovery chamber's conduit 108 is in gas communication with the vessel 102 via the upper port 122 (denoted as the gas port) for gas G to pass through, and in liquid communication with the vessel 102 via the lower port 124 (denoted as the liquid port) for liquid L to pass through. The conduit 108 further comprises a fluid outlet 132 located intermediate the upper and lower ports 126,128 and, as shown, closer to the upper opening 126. The fluid outlet 132 has an intake opening or port 138 for receiving particulate-free gas and liquid.

The opening 138 is an intake port of the fluid outlet 132, while the fluid outlet 132 may take any suitable shape, orientation and length as required. The elevation of the intake opening 138 of the fluid outlet 132 sets a gas/liquid interface in the recovery and treatment chambers 103,102. The intake port 138 of the fluid outlet 132 defines a freeboard interface 142. The freeboard interface 142 is described in greater detail below. As shown in FIG. 9, the intake port 138 of the fluid outlet 132 is at an elevation below the gas port 122 and the discharge end 148 of the fluid inlet 118 but above the liquid port 124.

The intake port 138 of the fluid outlet 132 divides the recovery chamber 103 into an upper, gas channel 134 from the gas port 122 of the conduit 108 to the intake port 138 of the fluid outlet 132, and a lower, liquid channel 136 from the liquid port 124 of the conduit 108 to the intake port 138 of the fluid outlet 132. Both channels 134 and 136 are in fluid communication with the treatment chamber 106, which is the entirety of vessel 102 in this embodiment, via the gas port 122 and liquid port 124, respectively. The gas and liquid channels 134 and 136 converge at the intake port 138 of the fluid outlet 132, are contiguous and in fluid communication.

As shown in FIG. 9, the treatment chamber 106 comprises therein a flow barrier or downcomer 130 laterally intermediate the fluid inlet 118 and the gas port 122, extending from the upper end wall 110 downwardly along the longitudinal axis X-X to a location vertically intermediate the gas port 122 of the treatment chamber 106 and the intake port 138 of the fluid outlet 132. The axis X-X extends generally from the top wall 114 to the bottom wall 116. The downcomer 130 may be a flat plate, a curved plate or the like that has a length and width sufficient for blocking direct access from the fluid inlet 118 to the gas port 122. Herein laterally refers to spacing perpendicular from the longitudinal axis X-X of the treatment chamber 106.

The intake port 138 of the fluid outlet 132 defines a freeboard interface 142 horizontally extending therefrom and across both the conduit 108 and the treatment chamber 106. The freeboard interface 142 partitions the treatment chamber 106 into a freeboard portion 144 formed thereabove and an accumulator portion 146 formed therebelow. The intake port 138 of the fluid outlet 132 is positioned at a location below the discharge end 148 of the fluid inlet 118, the fluid inlet 118 being directed into the freeboard portion 144.

As described above, the treatment chamber 106 comprises a particulate drain 120 in proximity with its lower end 112 coupling to a particulate collection structure 104. In this embodiment, the particulate collection structure 104 comprises a sand accumulation chamber 174 sandwiched between an inlet valve 172 and a discharge valve 176. Here, the inlet and discharge valves 172 and 176 are rated for sand slurry service.

The inlet valve 172 is connected to the particulate drain 120 on top thereof and to the sand accumulation chamber 174 therebelow, and the sand accumulation chamber 174 is in turn connected to the discharge valve 176 therebelow. The particulate collection structure 104 also comprises a particulate detector 178, e.g., an ultrasonic sand detector, to detect particulate accumulation in the sand accumulation chamber 174.

As will be described in more detail later, the inlet valve 172 may be set to the open position and the discharge valve 176 set to the closed position in normal operation to allow the sand accumulation chamber 174 to collect particulates and liquid from the particulate drain 120.

Conventional pressure safety valves and other gas phase related devices and instrumentation (not shown) may be reliably installed on the vessel 102.

Although not shown in the figures, the vessel 102 is supported by supporting structure to maintain the vessel 102 in its tilted orientation. In some use scenarios, the desanding device 100 is set up at an oil and gas well site. The connective piping of the fluid inlet 118 is connected to a wellhead, and the fluid outlet 132 is connected to downstream equipment.

In operation, the multiphase fluid stream F is injected from the wellhead through the fluid inlet 118 into the treatment chamber 106 downwardly at the angle α. As the fluid inlet 118 has a cross-section area smaller than that of the treatment chamber 106, the velocity of the fluid in the treatment chamber 106 is reduced comparing to that in the fluid inlet 118.

Under the influence of gravity, particulates P and liquid L in the fluid flow fall towards the bottom of the treatment chamber 106 via a trajectory path 150. The trajectory for dropping particulates P and the liquid L is governed by the fluid properties and the geometry of the treatment chamber 106. Once the particulates P and liquid L have dropped into the accumulator portion 146, they remain separated from the active flow stream and form a wet sand bank 152 on the bottom wall 116 of the treatment chamber 106. Such a sand bank 152 is unstable as the slope of the bottom wall 116 of the treatment chamber 106, defined by the inclination angle α, is steeper than the angle of repose of the wet sand bank. Therefore, particulates P and liquid L migrate towards the particulate collection structure 104. To aid in automated removal, the particulates P fall through the open inlet valve 172 into the sand accumulation chamber 174, as indicated by the arrow 154.

After start of operation, liquid L accumulates in the accumulate portion 146, and liquid L and particulates P removed from the fluid stream continue to accumulate therein. Particulates can be periodically removed, however at steady state, liquids accumulate until they reach the fluid outlet 132. Thus, in cases that the fluid stream F contains more liquid L than particulates P, a liquid surface of the accumulated liquid L rises upward towards and forms the freeboard interface 142.

As the inflow of liquid L exceeds removal with accumulated particulates P, the liquid interface would continue to grow higher but for the fluid outlet 132. Liquid L accumulates in both the treatment chamber and the recovery chamber, hydraulically balanced through lower port 128. Particulate laden liquid dominates in the treatment chamber 102 and particulate-free liquid dominants in the recovery chamber 103. Liquid L from the treatment chamber 102 enters the liquid channel 136, and moves upwardly towards the fluid outlet 132, as indicated by the arrow 156.

Gas G, having been relieved of any particulates therein, traverses the freeboard portion 144, and enters the gas channel 134 via the upper gas port 122 of the treatment chamber 106. Gas G moves down the gas channel 134 towards the fluid outlet 132 as indicated by the arrow 158, and is discharged from the fluid outlet 132 while particulates P and liquid L continue to accumulate in the accumulator portion 146.

Those skilled in the art appreciate that, before the liquid surface reaches the liquid port 124, gas G may also enter the liquid channel 136 from the liquid port 124. Moreover, before the steady state, i.e., before a liquid surface grows to the freeboard interface 142, gas G may also enters the liquid channel 136 from the gas port 122 via the gas channel 134.

As stated, at a steady state, the level of the liquid surface grows to the freeboard interface 142, formed at the intake port 138 of the fluid outlet 132. As liquid inflow continues to exceed liquid associated with particulates P collected at the collection structure 104, incoming oil and other liquids are re-entrained with the gas G exiting at the fluid outlet 132. Such a steady state operations last as long as accumulated particulates are removed, or sufficient accumulate storage volume is provided, so as maintain collected particulates free from the lower liquid port 124. Blockage of the lower port 124 of the recovery chamber 103 signals desanding failure, resulting in particulates being recovered at the fluid outlet 132, endangering the integrity of the downstream equipment and requiring a manual service cleaning cycle. Such desanding failure is prevented by automatically, continuously or periodically removing accumulated particulates from the particulate collection structure 104.

In cases that the fluid stream contains significant fraction of particulates, particulates accumulate quickly. Desanding would be quickly compromised if the accumulated particulates reach and plug the liquid port 124. Such an occurrence is prevented by removing accumulated particulates from the particulate collection structure 104.

The removal of accumulated particulates can be conducted continuously or periodically with the treatment chamber 106 remaining pressurized and in operation. In one embodiment, valves 172 and 176 are controlled manually by an operator or automatically with a timer or an ultrasonic sand detector to periodically open and close. Typically, an interlock is used to prevent the inlet and discharge valves from being open at the same time. In particular, the valve 172, between the treatment chamber 106 and the sand accumulation chamber 174 is normally open except at the time of particulate removal, allowing particulates to fall into the sand accumulation chamber 174. The discharge valve 176 is normally closed except at the time of particulate removal.

To remove particulates while maintaining the desanding device 100 in operation, the valve 172 is first closed. Valve 176 is then opened allowing the particulates contained in the sand accumulation chamber 174 to exit. After removing particulates from the sand accumulation chamber 174, valve 176 is closed and valve 172 is then reopened to allow particulates in the treatment chamber 106 to migrate into the sand accumulation chamber 174. Persons skilled in the art appreciate that the treatment chamber 106 has sufficient space to store particulates therein during the particulates-removing process, and the volume of the sand accumulation chamber 174 is sufficiently large to discharge enough particulates within a cleaning cycle so as not to cause a backup of particulates into valve 172 thereby preventing the valve to close. Both valves 172 and 176 are required to have service rated for abrasive slurries.

As an alternate, substantially continuous removal could be accomplished in a mass balance scenario with an automatic bleed down solids and some liquid as come in using flow of solids level control. Alternatively, periodic opening of a control valve, such as valve 172, could be performed manually, such controlled by visual inspection of the fraction of particulates in the blowdown while the valve is open, and closing once the flow is predominately liquid L. In such scenarios, valve 172 can be left open or cycled open and closed. Accordingly, valve 176 is opened only for a short period of time, or pulsed, sufficient to allow the volume of the sand accumulation chamber 174 to be evacuated, and closed again before the liquid inventory thereabove is exhausted.

Persons skilled in the art appreciate that, in various alternative embodiments, the gas and liquid channels 134 and 136 may be formed in various ways.

Figure 10:
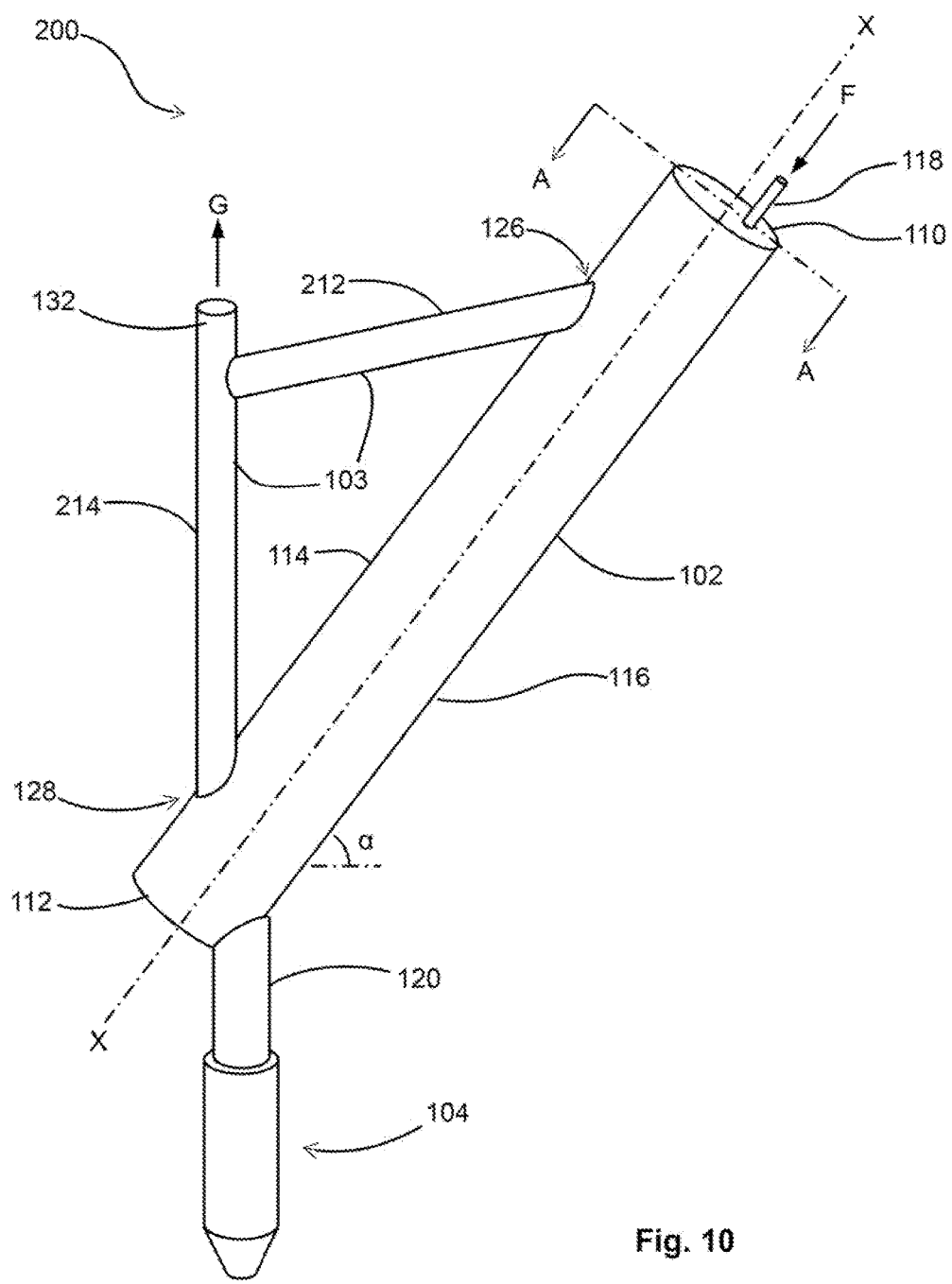
FIG. 10 is a perspective view of a desanding device according to an alternative embodiment, the desanding device comprising an inclined vessel forming a treatment chamber, and a recovery chamber having a gas channel and a liquid channel both in fluid communication with the treatment chamber, the recovery chamber forming a triangular structure with the vessel.
Figure 11:
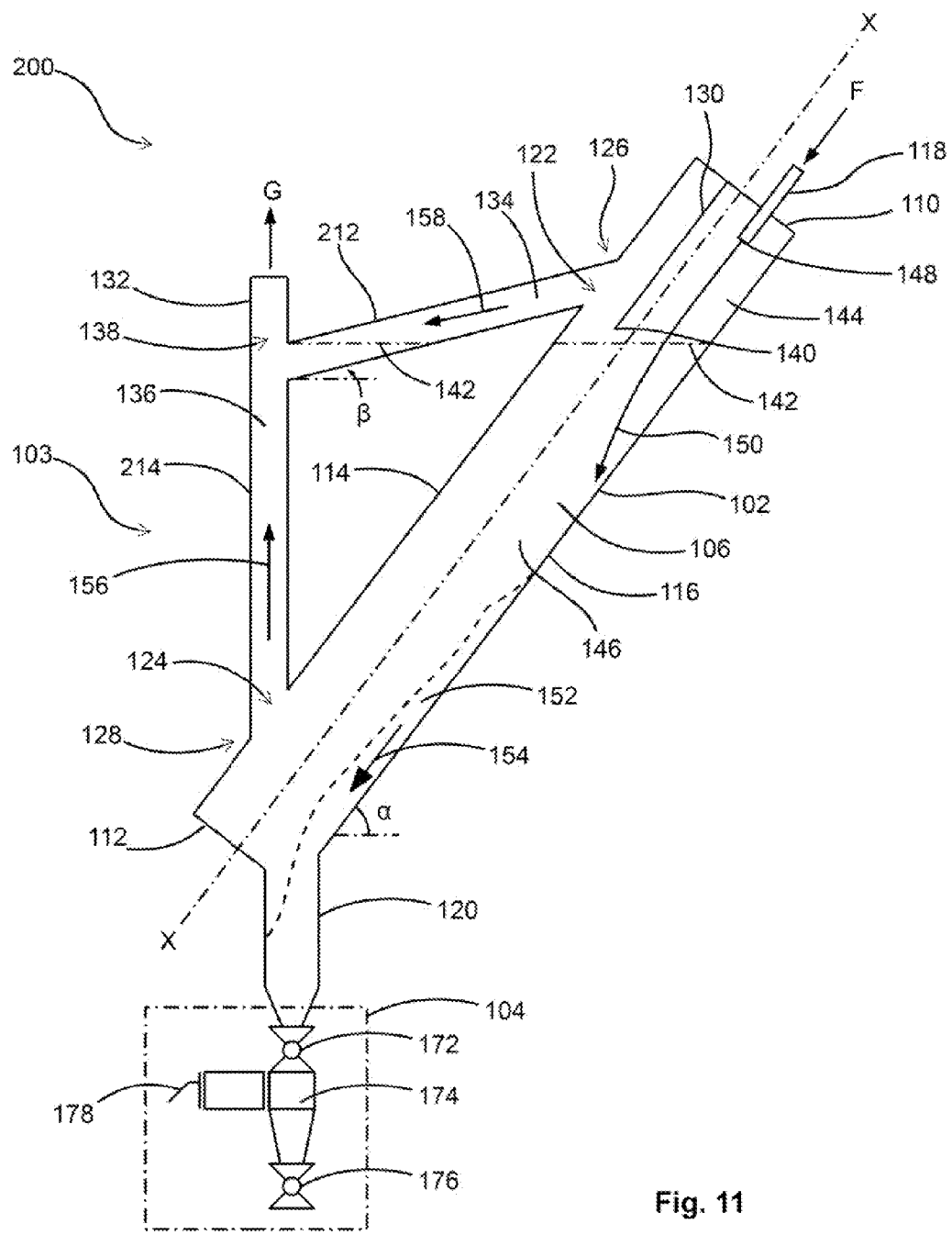
FIG. 11 is a cross-sectional view of the desanding device of FIG. 10 along section A-A.

With reference to FIGS. 10 and 11 a desanding device 200, according to an alternative embodiment, is similar to the desanding device 100 of FIGS. 8 and 9, wherein the entire vessel 102 forms a treatment chamber 106. However, the recovery chamber 103, having the liquid and gas channels 136 and 134, in this embodiment is made of two conduits, which, together with the vessel 102, form a generally triangular structure relative to the vessel 102, the gas channel 134 sloping somewhat to the fluid outlet 132, whilst the liquid channel 136 being substantially vertical.

In this embodiment, the liquid channel 136 is formed by a vertically oriented conduit 214 extending upwardly from the liquid port 124. The conduit 214 comprises an opening 138 near its upper end at a location lower than the gas port 122. A conduit 212 extends from the opening 138 upwardly at an inclination angle β to the gas port 122, forming the gas channel 134. The portion of the conduit 214 from the liquid port 124 to the opening 318 forms the liquid channel 136, and the portion of the conduit 214 from the opening 318 to the upper end thereof forms a fluid outlet 132, with the opening 138 acting as the intake port thereof. The gas and liquid channels 134 and 136 converge at the intake port 138 of the fluid outlet 132, and are in fluid communication therewith.

The intake port 138 of the fluid outlet 132 defines a freeboard interface 142 extending horizontally in the gas channel 134 and the treatment chamber 106. The freeboard interface 142 partitions the treatment chamber 106 into a freeboard portion 144 thereabove and an accumulator portion 146 therebelow.

Similar to the desanding device 100 of FIGS. 8 and 9, the discharge end 148 of the fluid inlet 118 is at an elevation above the intake port 138 of the fluid outlet 132. Also, the treatment chamber 106 comprises therein a downcomer 130 laterally intermediate the fluid inlet 118 and the gas port 122, extending from the upper end wall 110 downwardly along the longitudinal axis X-X to a location vertically intermediate the gas port 122 and the intake port 138 of the fluid outlet 132. The downcomer 130 may be a flat plate, a curved plate or the like that has a length and width sufficient for blocking direct access from the fluid inlet 118 to the gas port 122. The operation of the desanding device 200 is the same as that of the desanding device 100 of FIGS. 8 and 9.

Figure 12:
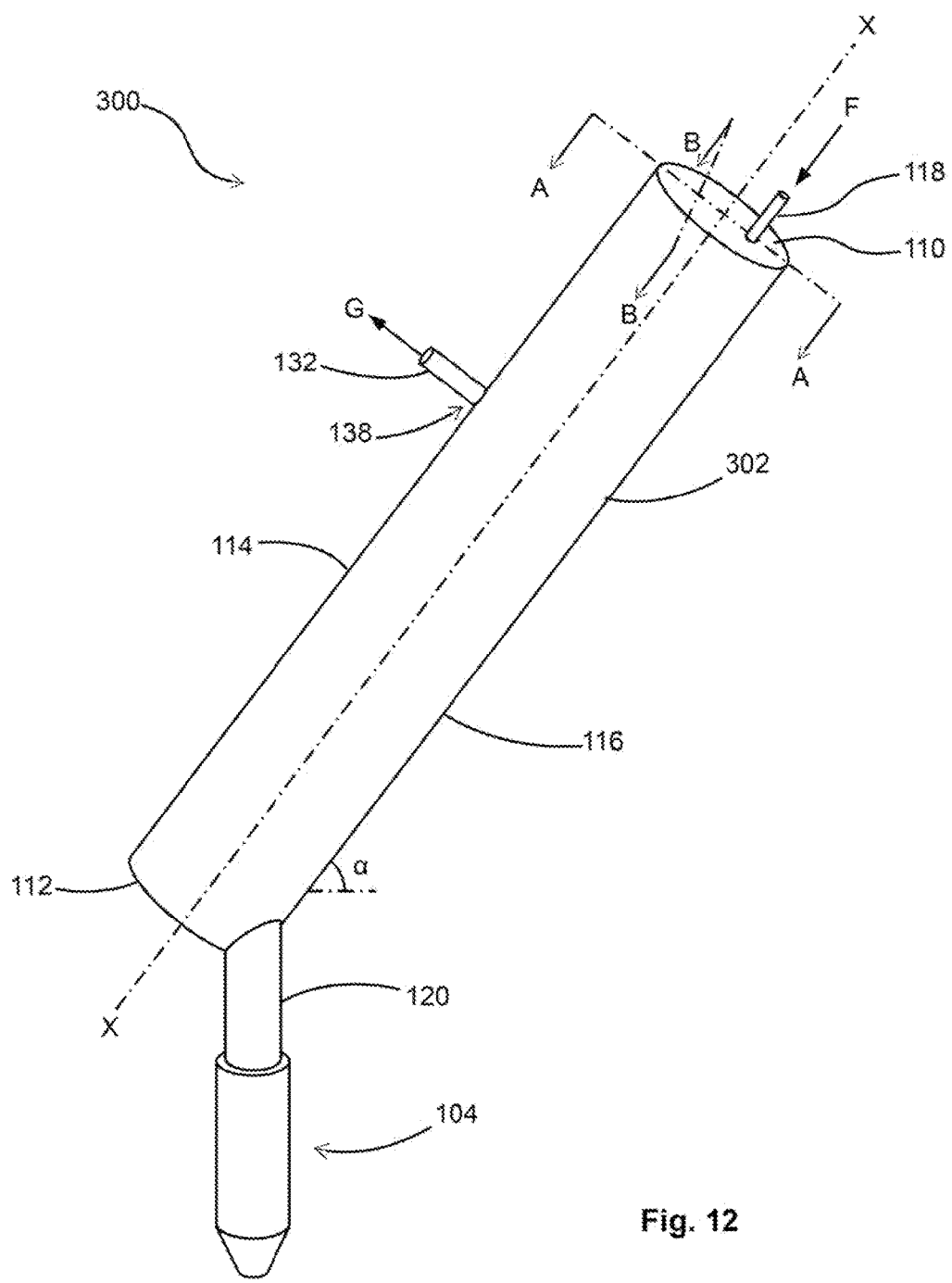
FIG. 12 is a perspective view of a desanding device according to an alternative embodiment, the desanding device comprising an inclined vessel, a baffle in the vessel dividing the vessel into a treatment chamber and a recovery chamber.
Figure 13:
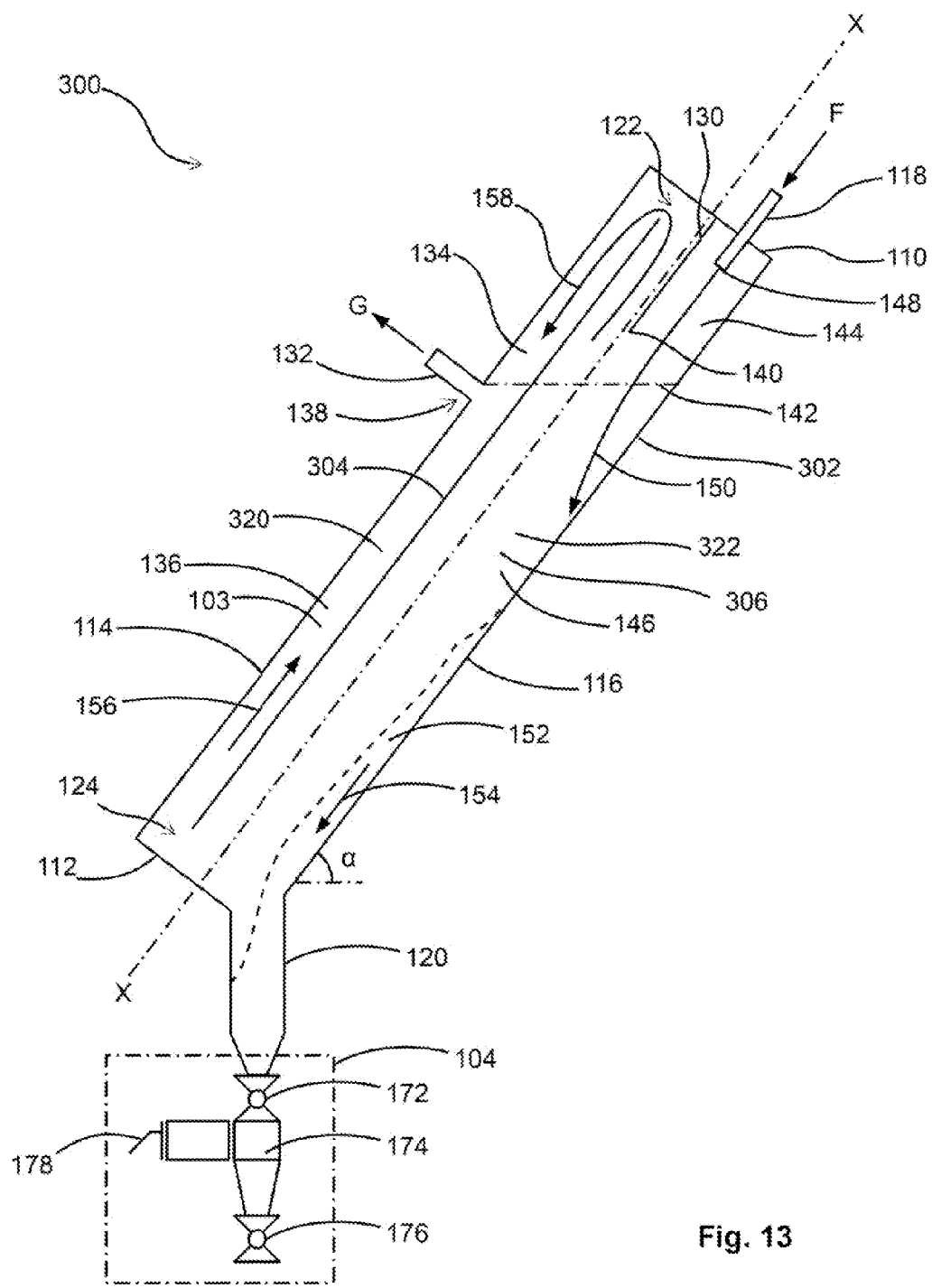
FIG. 13 is a cross-sectional view of the desanding device of FIG. 12 along section A-A.
Figure 14:
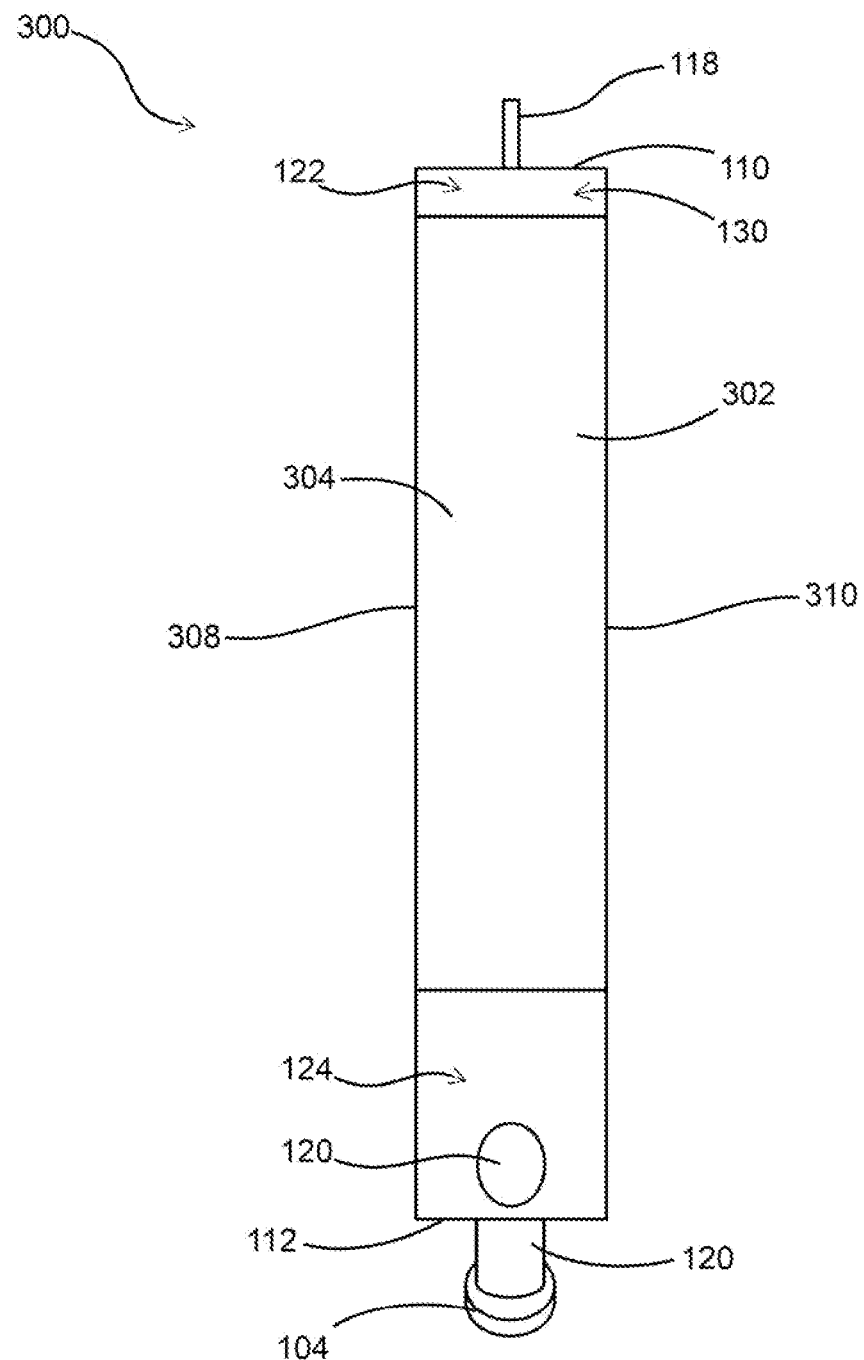
FIG. 14 is a cross-sectional view of the desanding device of FIG. 12 along section B-B.

With reference to FIGS. 12 to 14, a desanding device 300 is shown, according to another embodiment, the device 300 having a recovery chamber 103 comprising a gas and a liquid channel 134 and 136 within the vessel 302. As the gas and liquid channels 134 and 136 are within the vessel 302, displacing treatment chamber volume, the vessel 302 has a larger cross-section than does the vessel 102 of FIGS. 8 and 9 for achieving the same desanding throughput or capacity.

As can be seen, the desanding device 300 comprises a vessel 302 similar to the vessel 102 of FIGS. 8 and 9. The vessel 302 is an elongated cylindrical container inclined at a predefined inclination angle α greater than the angle of repose of a bank of wet particulates. Similar to the vessel 102 of FIGS. 8 and 9, the vessel 302 comprises a top wall 114, a bottom wall 116, an upper end wall 110 and a lower end wall 112.

In this embodiment, the vessel 302 comprises therein a baffle 304 extending from a position adjacent to the top end 110 of the vessel 302 downwardly in a direction generally along the inclined longitudinal axis X-X to a position adjacent to the bottom end 112 thereof, and extending laterally from one side wall 308 of the vessel 302 to the other side wall 310 thereof (see FIG. 14).

The baffle 304 divides the vessel 302 to an upper portion 320 thereabove and a lower portion 322 therebelow, the lower portion 322 having a cross-sectional area much larger than that of the upper portion 302. The upper and lower portions 320 and 322 are in fluid communication via an upper, gas port 122, i.e., the gap between the baffle 304 and the upper end wall 110 of the vessel 302, and a lower, liquid port 124, i.e., the gap between the baffle 304 and the lower end 112 of the vessel 302.

The upper portion 320 of the vessel 302 comprises a fluid outlet 132 on the top wall 114 near the upper end wall 110 with an intake port 138 at an elevation below the gas port 122 but above the liquid port 124.

The lower portion 322 of the vessel 302 comprises a fluid inlet 118 at the upper end wall 110 of the vessel 302 oriented in a direction generally along the longitudinal axis X-X for receiving the multiphase fluid stream F. The fluid inlet 118 comprises a discharge end 148 at an elevation above the intake port 138 of the fluid outlet 132.

The lower portion 322 of the vessel 302 forms a treatment chamber 306. A gas channel 134 is formed in the upper portion 320 from gas port 122 to the intake port 138 of the fluid outlet 132. The gas channel 134 is in communication with the treatment chamber 306 via the gas port 122 generally for gas G to pass therethrough. A liquid channel 136 is formed in the upper portion 320 from the liquid port 124 to the intake port 138 of the fluid outlet 132. The liquid channel 136 is in communication with the treatment chamber 306 via the liquid port 124 generally for liquid L to pass therethrough. The gas and liquid channels 134 and 136 converge at the intake port 138 of the fluid outlet 132, and are in fluid communication therewith.

The intake port 138 of the fluid outlet 132 defines a freeboard interface 142 extending horizontally in the gas channel 134 and the treatment chamber 306. The freeboard interface 142 partitions the treatment chamber 306 into a freeboard portion 144 thereabove and an accumulator portion 146 therebelow.

Similar to the desanding device 100 of FIGS. 8 and 9, the treatment chamber 306 of the desanding device 300 comprises therein a downcomer 130 laterally intermediate the fluid inlet 118 and the gas port 122, extending from the upper end wall 110 downwardly along the longitudinal axis X-X to a location vertically intermediate the gas port 122 and the intake port 138 of the fluid outlet 132. The downcomer 130 may be a flat plate, a curved plate or the like that has a length and width sufficient for blocking direct access from the fluid inlet 118 to the gas port 122. The operation of the desanding device 300 is the same as that of the desanding device 100 of FIGS. 8 and 9.

In an alternative embodiment, the baffle 304 extends from the top end wall 110 of the vessel 302 downwardly in a direction generally along the inclined axis X-X to the bottom end wall 112 thereof, and extending from one side wall 308 of the vessel 302 to the other side wall 310 thereof. The baffle 304 comprising an upper hole adjacent to the upper end wall 110 of the vessel 302, forming the upper, gas port 122, and a lower hole adjacent to the lower end 112 of the vessel 302, forming the lower, liquid port 124. Other aspects of the desanding device in this embodiment is the same as the desanding device 300 of FIGS. 12 to 14.

Figure 15:
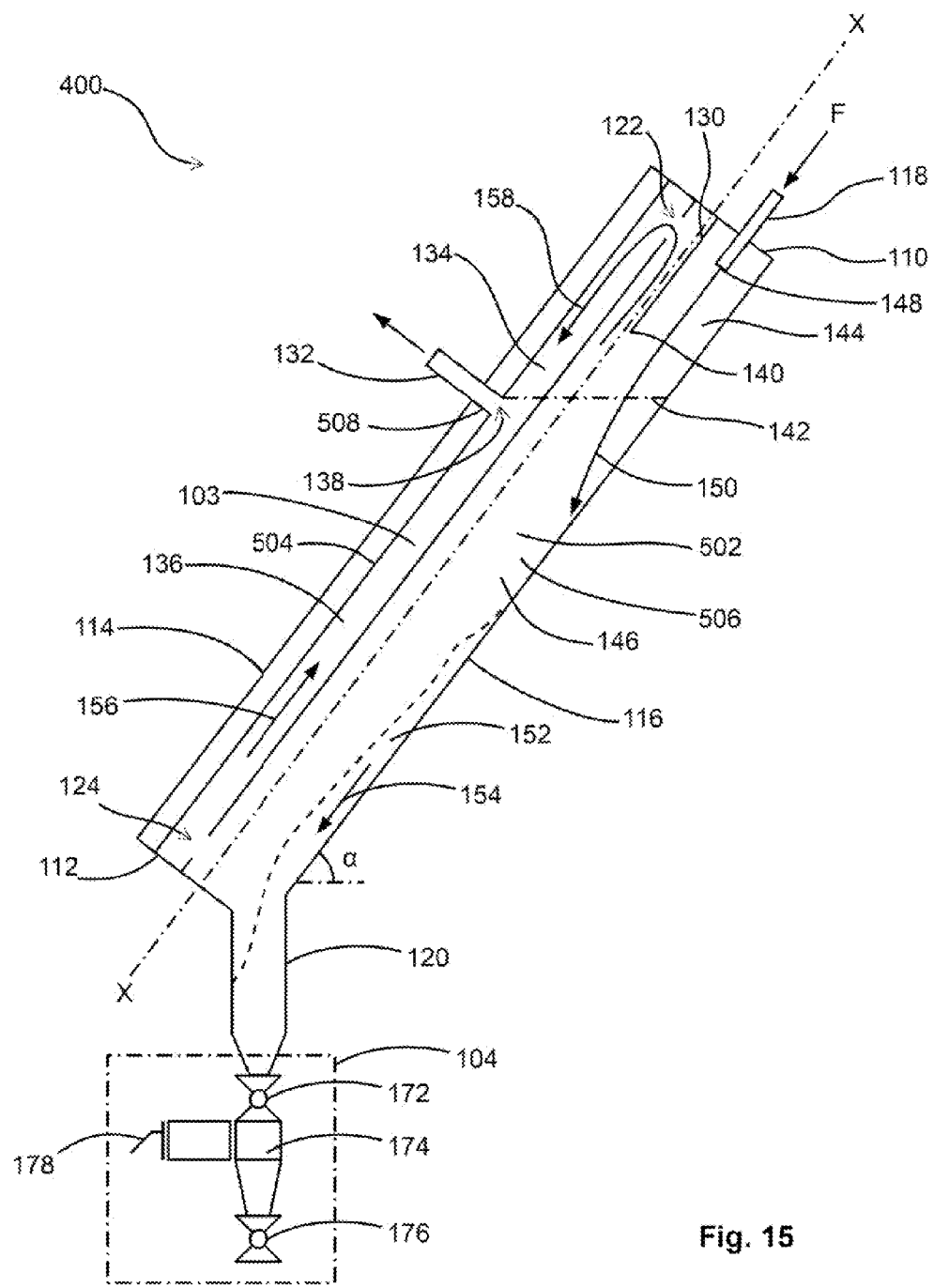
FIG. 15 is a cross-sectional view of a desanding device according to an alternative embodiment, the desanding device comprising an inclined vessel and a conduit received in the vessel for forming a recovery chamber, and defining a treatment chamber between the vessel and the conduit, the recovery chamber having a gas and a liquid channel in fluid communication with the treatment chamber.

FIG. 15 shows a cross-sectional view of a desanding device 400 according to yet another embodiment. Similar to the desanding devices described above, the desanding device 400 comprises an elongated vessel 502 inclined at a predefined angle α greater than the angle of repose of a bank of wet particulates. The vessel 502 receives therein an elongated conduit 504 extending from the upper end wall 110 along the axis X-X of the vessel 502 to the lower end wall 112. The conduit 504 has a cross-sectional area much smaller than that of the vessel 502, and comprises an upper, gas port 122 adjacent its upper end, and a lower, liquid port 124 adjacent its lower end. The conduit 504 further comprises a fluid outlet 508 coupling to a fluid outlet 132 of the vessel 502. The fluid outlet 508 comprise an intake port 138 on the conduit 504 at an elevation intermediate the gas and liquid ports 122 and 124, and below the discharge end 148 of the fluid inlet 118.

The conduit 504 forms the recovery chamber 103 comprising the gas and liquid channels 134 and 136. In particular, the upper, gas channel 134 is formed by the portion of the conduit 504 from the gas port 122 to the intake port 138 of the fluid outlet 508, and the liquid channel 136 is formed by the portion of the conduit 504 from the liquid port 124 to the intake port 138 of the fluid outlet 508. The gas and liquid channels converge at the intake port 138 of the fluid outlet 508, and are in fluid communication therewith.

The conduit 504 also defines a treatment chamber 506 being the annulus between the vessel 502 and the conduit 504, i.e., the interior space of the vessel 502 outside the conduit 504. The treatment chamber 506 is in communication with the gas channel 134 via the gas port 122 and in communication with the liquid channel 136 via the liquid port 124.

The intake port 138 of the fluid outlet 508 defines a freeboard interface 142 horizontally extending therefrom and across the gas channel 134 and the treatment chamber 506. The freeboard interface 142 partitions the treatment chamber 506 into a freeboard portion 144 thereabove and an accumulator portion 146 therebelow.

Similar to the desanding device 100 of FIGS. 8 and 9, the treatment chamber 506 comprises therein a downcomer 130 laterally intermediate the fluid inlet 118 and the gas port 122, extending from the upper end wall 110 downwardly along the longitudinal axis X-X to a location vertically intermediate the gas port 122 and the intake port 138 of the fluid outlet 132. The downcomer 130 may be a flat plate, a curved plate or the like that has a length and width sufficient for blocking direct access from the fluid inlet 118 to the gas port 122. The operation of the desanding device 400 is the same as that of the desanding device 100 of FIGS. 8 and 9.

Figure 16:
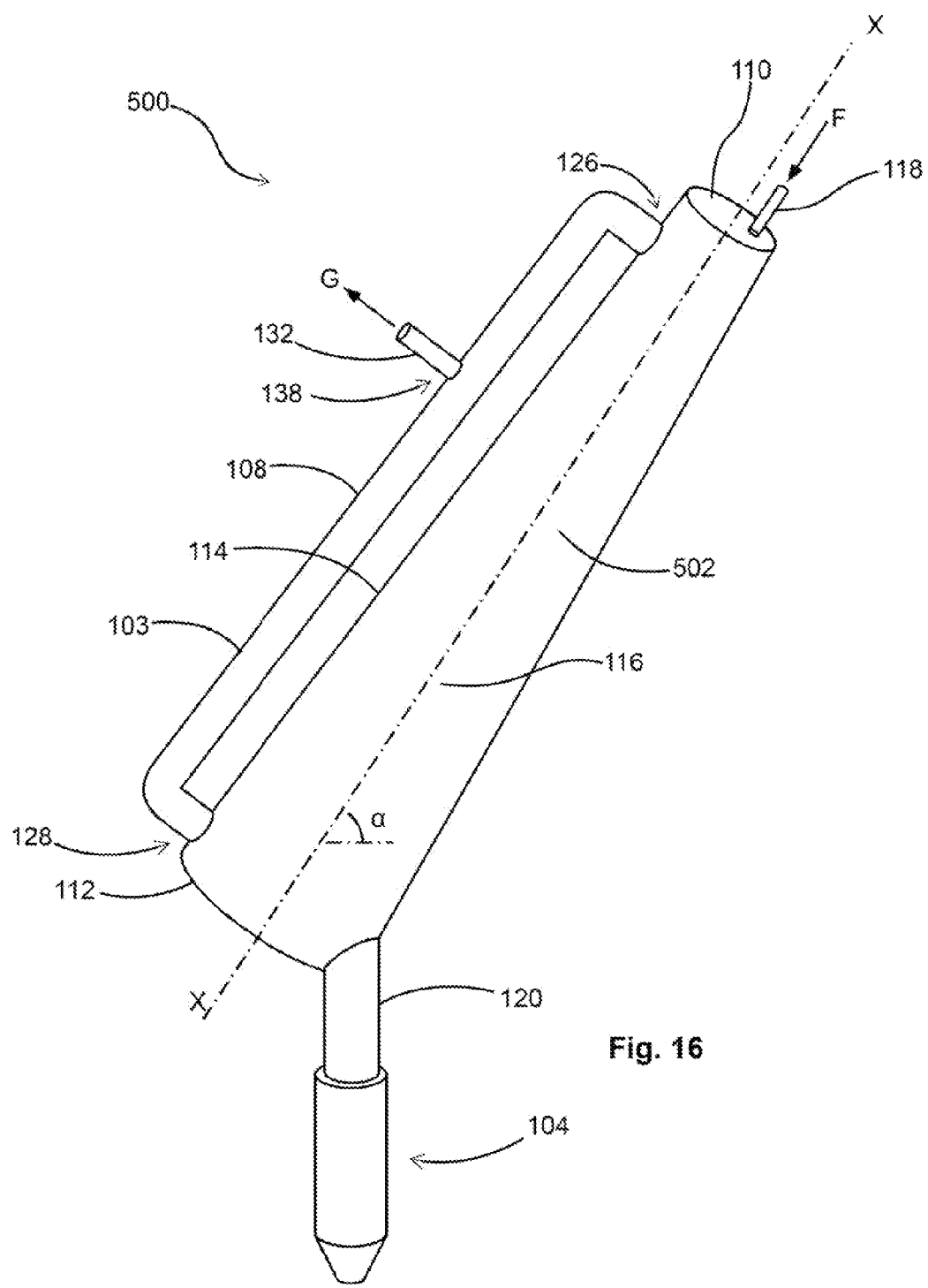
FIG. 16 is a perspective view of a desanding device according to an alternative embodiment, the desanding device comprising an inclined, conical shaped vessel forming a treatment chamber, and an inclined conduit forming a recovery chamber.

Although in above embodiments, the vessel is a cylindrical tube, those skilled in the art appreciate that the vessel may alternatively have a different shape such as a frustum or conical shape, a cubic shape or the like, in accordance with the particular design and pressure-resistance requirements. FIG. 16 shows a desanding device 500 that is the same as the desanding device 100 of FIGS. 8 and 9 except that the vessel 502 in this embodiment has a frustum shape with the lower end wall 112 larger than the upper end wall 110. Of course, those skilled in the art appreciate that, in an alternative embodiment, the vessel 502 may have a frustum shape with the lower end wall thereof larger than the upper end wall thereof.

Figure 17:
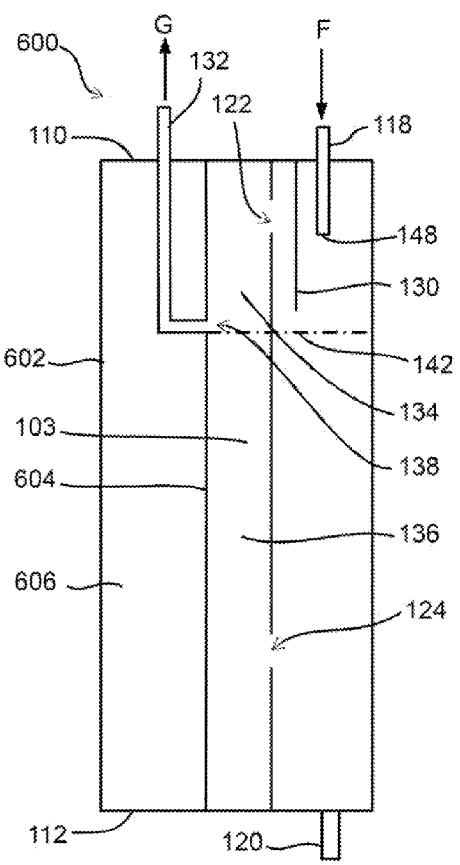
FIG. 17 is a cross-sectional view of a desanding device according to an alternative embodiment, the desanding device comprising a vertically oriented vessel and a vertically oriented conduit extending from the top wall of the vessel to the bottom wall thereof, the conduit forming a recovery chamber and defining a treatment chamber between the vessel and the conduit.

In some alternative embodiments, the vessel may be vertically oriented, i.e., having an inclination angle α of 90°. For example, FIG. 17 shows a desanding device 600 according to one embodiment. In this example and the examples hereinafter, the particulate collection structure is not shown for the ease of illustration.

The desanding device 600 comprises a vertically oriented vessel 602 receiving therein an also vertically oriented conduit 604 extending from the top wall 110 of the vessel 602 to the bottom wall 112 thereof. The conduit 604 has a cross-sectional area much smaller than that of the vessel 602, and comprises an upper, gas port 122 and a lower, liquid port 124. A fluid outlet 132 extends downwardly into the vessel 602 from the top wall 110 thereof and couples to the conduit 604 at an intake port 138.

The conduit 604 forms the recovery chamber 103 comprising the gas and liquid channels 134 and 136. In particular, the upper, gas channel 134 is formed by the portion of the conduit 604 from the gas port 122 to the intake port 138 of the fluid outlet 132, and the liquid channel 136 is formed by the portion of the conduit 604 from the liquid port 124 to the intake port 138 of the fluid outlet 132. The gas and liquid channels converge at the intake port 138 of the fluid outlet 132, and are in fluid communication therewith.

The conduit 604 also defines a treatment chamber 606 being the annulus between the vessel 602 and the conduit 604, which is in communication with the gas channel 134 via the gas port 122 and in communication with the liquid channel 136 via the liquid port 124.

The intake port 138 of the fluid outlet 132 defines a freeboard interface 142. The treatment chamber 606 comprises a fluid inlet 118 extending downwardly from the top wall 110 of the vessel 602 with a discharge end 148 above the intake port 138 of the fluid outlet 132.

In this embodiment, the treatment chamber 606 further comprises therein a downcomer 130 laterally intermediate the fluid inlet 118 and the gas port 122, extending from the upper end wall 110 downwardly to a location vertically intermediate the gas port 122 and the intake port 138 of the fluid outlet 132. The downcomer 130 may be a flat plate, a curved plate or the like that has a length and width sufficient for blocking direct access from the fluid inlet 118 to the gas port 122.

Figure 18:
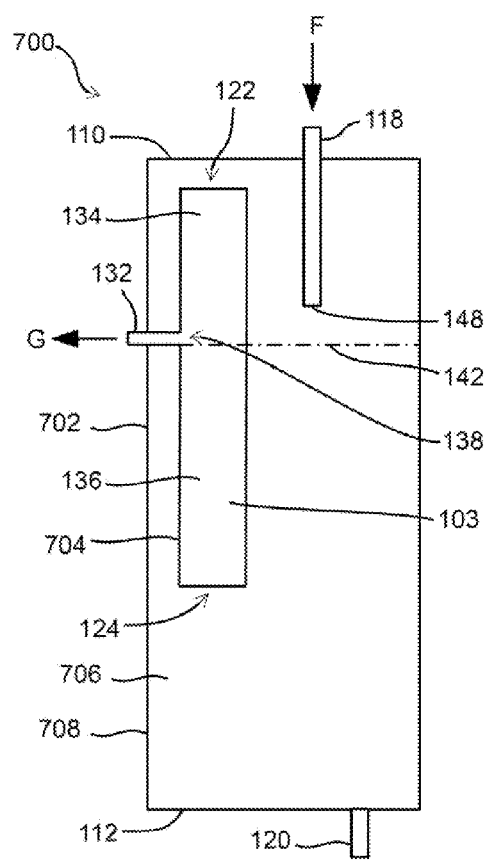
FIG. 18 is a cross-sectional view of a desanding device according to an alternative embodiment, the desanding device comprising a vertically oriented vessel and a vertically oriented conduit extending from a location proximate the top wall of the vessel to a location proximate the bottom wall thereof, the conduit forming a recovery chamber and defining a treatment chamber between the vessel and the conduit.

In some alternative embodiments, the vessel may not comprise a downcomer 130 for blocking direct access from the fluid inlet 118 to the gas port 122. For example, FIG. 18 shows a desanding device 700 according to one embodiment. The desanding device 700 comprises a vertically oriented vessel 702 receiving therein a vertically oriented conduit 704 extending from a location proximate the top wall 110 of the vessel 702 to a location proximate the bottom wall 112 thereof, forming the recovery chamber 103. The conduit 704 has a cross-sectional area much smaller than that of the vessel 702, and comprises an upper, gas port 122 and a lower, liquid port 124. A fluid outlet 132 extends from an intake port 138 on the conduit 704 radially outwardly to the side wall 708 of the vessel 700.

The intake port 138 of the fluid outlet 132 divides the conduit 704 or recovery chamber 103 into an upper, gas channel 134 from the gas port 122 of the conduit 704 to the intake port 138 of the fluid outlet 132, and a lower, liquid channel 136 from the liquid port 124 of the conduit 108 to the intake port 138 of the fluid outlet 132. The conduit 704 also defines a treatment chamber 706 being the annulus between the vessel 702 and the conduit 704.

Both channels 134 and 136 are in fluid communication with the treatment chamber 706 via the gas port 122 and liquid port 124, respectively. The gas and liquid channels 134 and 136 converge at the intake port 138 of the fluid outlet 132, and are in fluid communication therewith. The intake port 138 of the fluid outlet 132 defines a freeboard interface 142.

The treatment chamber 706 comprises a fluid inlet 118 extending downwardly from the top wall 110 of the vessel 702 with a discharge end 148 above the intake port 138 of the fluid outlet 132. In this embodiment, the discharge end 148 is sufficiently spaced from the gas port 122 for preventing direct access from the fluid inlet 118 to the gas port 122. Therefore, the treatment chamber 706 does not comprise any downcomer laterally intermediate the fluid inlet 118 and the gas port 122.

Figure 19:
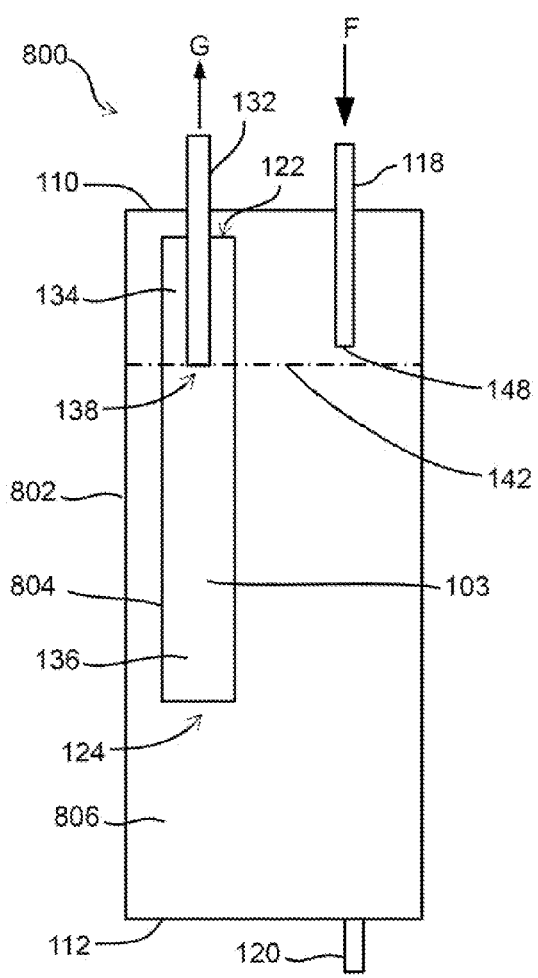
FIG. 19 is a cross-sectional view of a desanding device according to an alternative embodiment, the desanding device is similar to that of FIG. 18 except that an intake end or opening of the fluid outlet is received in the conduit.

FIG. 19 shows a desanding device 800 according to one embodiment. The desanding device 800 comprises a vertically oriented vessel 802 receiving therein a vertically oriented conduit 804 extending from a location proximate the top wall 110 of the vessel 802 to a location proximate the bottom wall 112 thereof, forming the recovery chamber 103. The conduit 804 has a cross-sectional area much smaller than that of the vessel 702, and comprises an upper, gas port 122 and a lower, liquid port 124. A fluid outlet 132 extends from the top wall 110 of the vessel 700 downwardly into the conduit 804 such that an intake port 138 of the fluid outlet 132 is within the conduit 804. In this embodiment, the conduit 804 is laterally located approximate one side of the vessel 802.

The intake port 138 of the fluid outlet 132 divides the conduit 804 or the recovery chamber 103 into an upper, gas channel 134, which is the annulus between the conduit 804 and the fluid outlet 132 from the gas port 122 of the conduit 804 to the intake port 138 of the fluid outlet 132, and a lower, liquid channel 136 from the liquid port 124 of the conduit 108 to the intake port 138 of the fluid outlet 132. The conduit 804 also defines a treatment chamber 806 being the annulus between the vessel 802 and the conduit 804. Both channels 134 and 136 are in fluid communication with the treatment chamber 806 via the gas port 122 and liquid port 124, respectively. The gas and liquid channels 134 and 136 converge at the intake port 138 of the fluid outlet 132, and are in fluid communication therewith. The intake port 138 of the fluid outlet 132 defines a freeboard interface 142. Other aspects of the desanding device 800 are similar to the desanding device 700 of FIG. 18.

Figure 20:
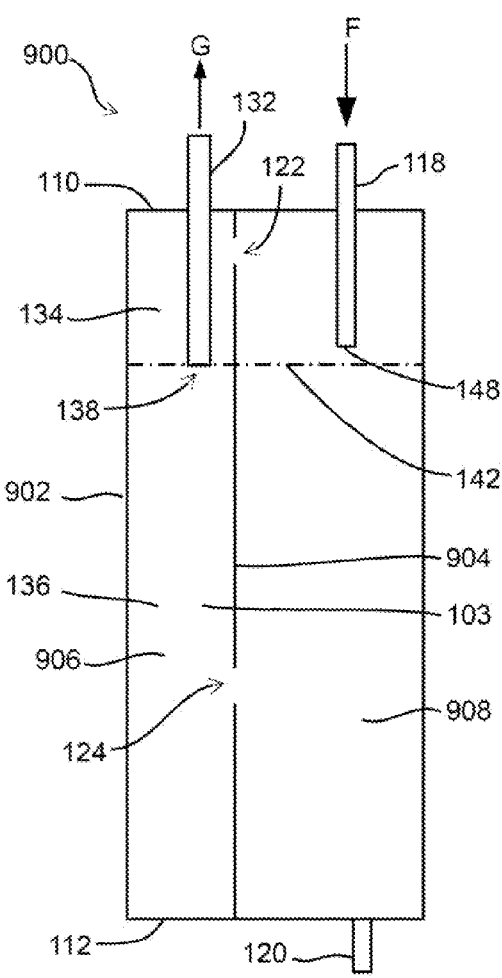
FIG. 20 is a cross-sectional view of a desanding device according to an alternative embodiment, the desanding device comprising a vertically oriented vessel and a vertically oriented baffle in the vessel dividing the vessel into a treatment chamber and a recovery chamber in fluid communication with each other.

As shown in FIG. 20, in an alternative embodiment, the desanding device 900 comprises a vertically oriented vessel 902. A vertically oriented baffle 904 extending from the top wall 110 of the vessel 902 to the bottom wall 112 thereof divides the vessel 902 into a first portion 906 as the recovery chamber 103 and a second portion 908 as the treatment chamber 908, the second portion 908 having a cross-sectional area much larger than that of the first portion 906. The baffle 904 comprises an upper, gas port 122 and a lower, liquid port 124. A fluid inlet 118 extends downwardly from the top wall 110 of the vessel 902 into the second portion 908, and a fluid outlet 132 extends downwardly from the top wall 110 of the vessel 700 into the first portion 906. The intake port 138 of the fluid outlet 132 is at an elevation intermediate the gas port 122 and the liquid port 124. The discharge end 148 of the fluid inlet 118 is at an elevation intermediate the gas port 122 and the intake port 138.

The intake port 138 of the fluid outlet 132 divides the first portion 906 or the recovery chamber 103 into an upper, gas channel 134, which is the annulus between the first portion 906 and the fluid outlet 132 from the gas port 122 of the baffle 904 to the intake port 138 of the fluid outlet 132, and a lower, liquid channel 136 from the liquid port 124 of the baffle 904 to the intake port 138 of the fluid outlet 132. The second portion 908 forms a treatment chamber 908. Both channels 134 and 136 are in fluid communication with the treatment chamber 908 via the gas port 122 and liquid port 124, respectively. The gas and liquid channels 134 and 136 converge at the intake port 138 of the fluid outlet 132, and are in fluid communication therewith. The intake port 138 of the fluid outlet 132 defines a freeboard interface 142. Other aspects of the desanding device 800 are similar to the desanding device 300 of FIGS. 12 and 13.

Figure 21:
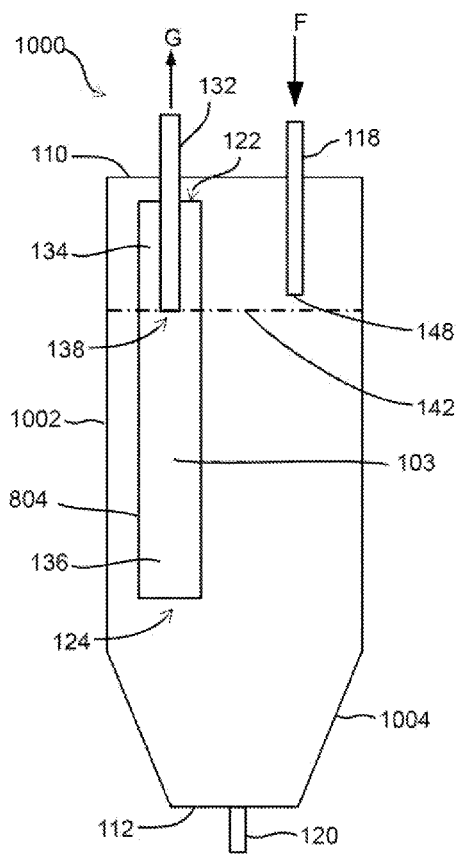
FIG. 21 is a cross-sectional view of a desanding device according to an alternative embodiment, the desanding device is similar to that of FIG. 19 except that the vessel comprises a tapering, conical shaped lower portion.

As described above, the vessel of the desanding device may have any suitable shape. For example, FIG. 21 shows a desanding device 1000 in an alternative embodiment. The desanding device 1000 is the same as the desanding device 800 of FIG. 19 except that, in this embodiment, the vessel 1002 of the desanding device 1000 has a conical lower portion 1004 tapering downwardly to a bottom wall 112 of a diameter smaller than that of the rest part of the vessel 1002.

In above embodiments, the fluid inlet 118 is oriented generally parallel to the longitudinal axis of the vessel. However, in some alternative embodiments, the fluid inlet 118 may be oriented in other directions.

Figure 22:
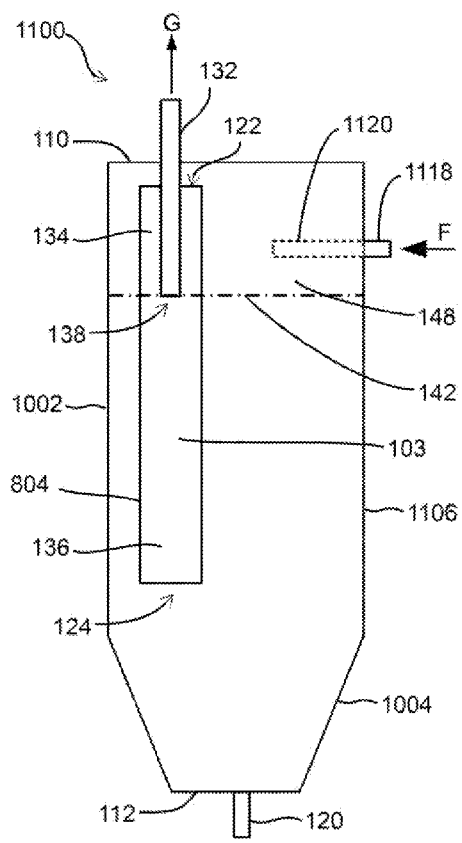
FIG. 22 is a cross-sectional side view of a desanding device according to an alternative embodiment, the desanding device is similar to that of FIG. 21 except that the fluid inlet is oriented generally horizontally and tangential to the side wall of the vessel.
Figure 23:
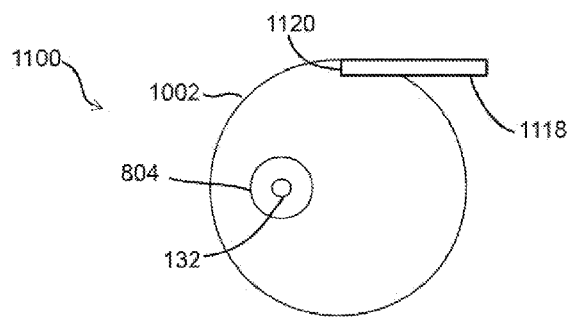
FIG. 23 is a cross-sectional top view of the desanding device of FIG. 22.

FIGS. 22 and 23 show a desanding device 1100 in another embodiment. The desanding device 1100 is the same as the desanding device 1000 of FIG. 21 except that, in this embodiment, the vessel 1002 of the desanding device 1100 comprises a fluid inlet 1118 on its side wall 1106. The fluid inlet 1118 is oriented generally horizontally and comprises a discharge end 1120 discharging a fluid stream into the vessel 1002 along a direction generally tangential to the side wall 1106 thereof. In this embodiment, the fluid outlet 132 and the conduit 804 are biased from the horizontal center of the vessel 1002. However, those skilled in the art appreciate that the fluid outlet 132 and the conduit 804 may alternatively be concentric with the vessel 1002.

Figure 24:
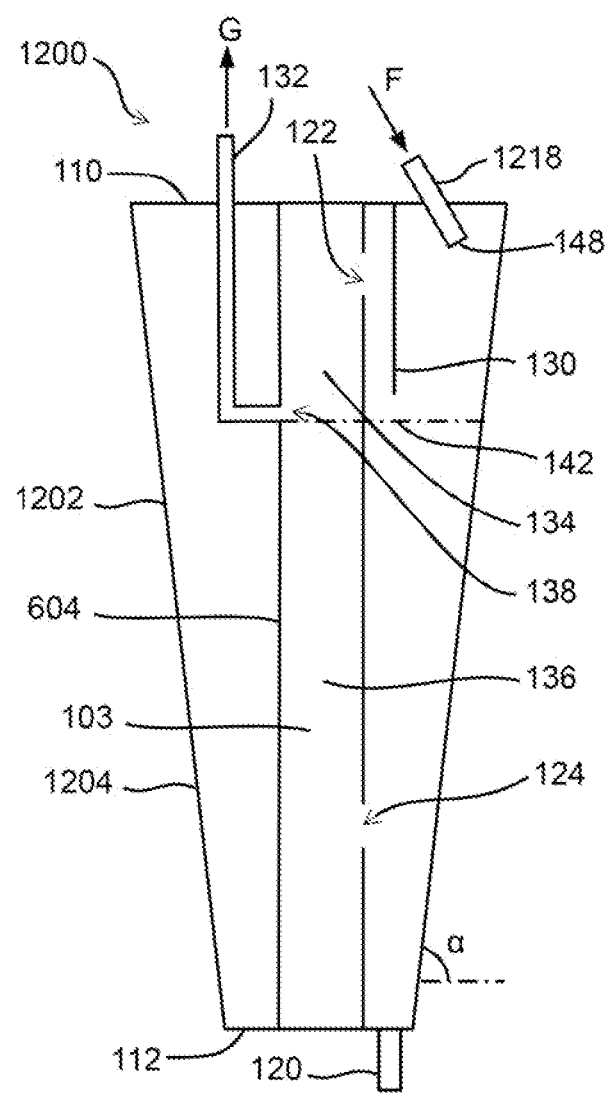
FIG. 24 is a cross-sectional view of a desanding device according to an alternative embodiment, the desanding device comprising a conical shaped vessel and a vertically oriented conduit extending from the top wall of the vessel to the bottom wall thereof, the conduit forming a recovery chamber and defining a treatment chamber between the vessel and the conduit.

FIG. 24 shows a desanding device 1200 in another embodiment. The desanding device 1200 is the same as the desanding device 600 of FIG. 17 except that, in this embodiment, the vessel 1202 has a frustum shape with the top wall 100 larger than the bottom wall 112, and that the fluid inlet 1218 is oriented towards the side wall 1204 of the vessel 1202. In this embodiment, the side wall 1204 has an angle α with respect to a horizontal plane that is greater than the angle of repose of a bank of wet particulates. A disadvantage of the desanding device 1200 is that the fluid stream F discharged from the fluid inlet 1218 impinges the side wall 1204, causing erosion thereto.

Figure 25:
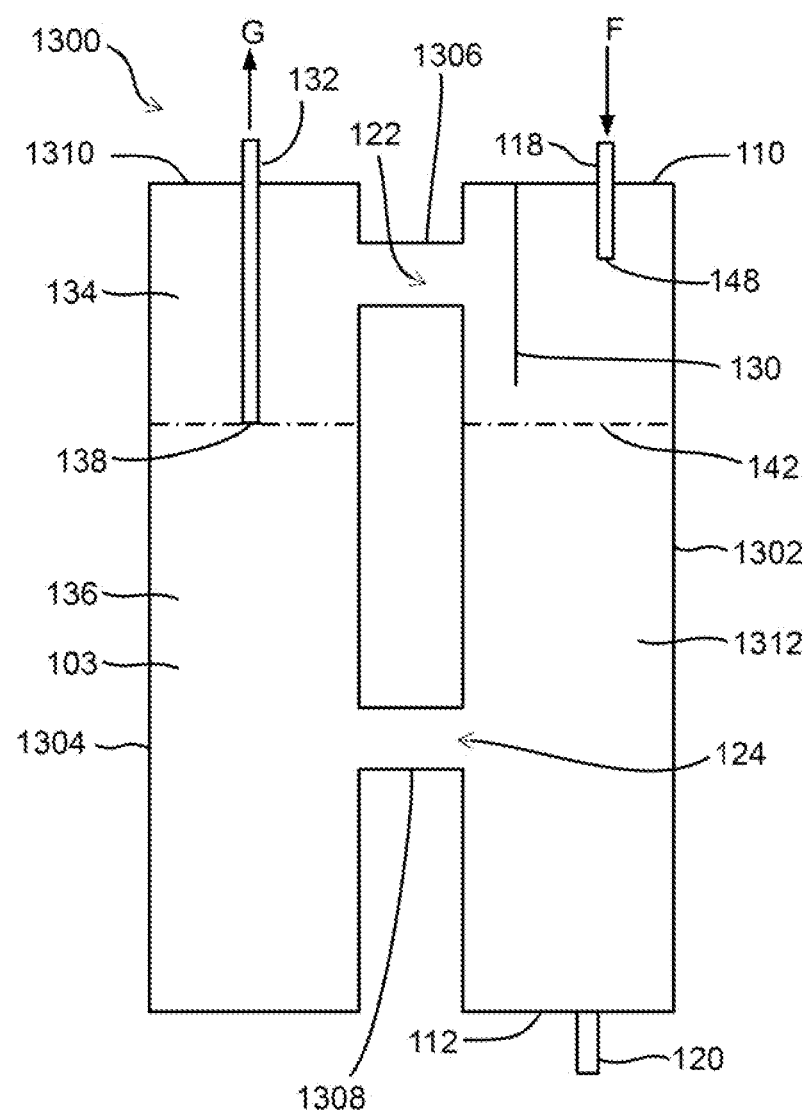
FIG. 25 is a cross-sectional view of a desanding device according to an alternative embodiment, the desanding device comprising a vertically oriented treatment vessel having a fluid inlet and a vertically oriented recovery tank having a fluid outlet, the treatment vessel being in fluid communication with the recovery tank via a gas conduit and a liquid conduit.

FIG. 25 shows a desanding device 1300 according to an alternative embodiment. As shown, the desanding device 1300 comprises a vertically oriented treatment vessel 1302 receiving a fluid inlet 118 extending downwardly from the top wall 110 of the vessel 1302. The desanding device 1300 also comprises a vertically oriented recovery tank 1304 receiving a fluid outlet 132 extending downwardly from the top wall 1310 of the tank 1304. The vessel 1302 and the tank 1304 are in fluid communication via an upper conduit 1306 and a lower conduit 1308, which forms the gas port 122 and liquid port 124, respectively. The intake port 138 of the fluid outlet 132 is at an elevation intermediate the gas port 122 and the liquid port 124. The discharge end 148 of the fluid inlet 118 is at an elevation intermediate the gas port 122 and the intake port 138.

The entire vessel 1302 forms a treatment chamber 1312. The intake port 138 of the fluid outlet 132 divides the tank 1304 into an upper, gas channel 134, which is the annulus between the tank 1304 and the fluid outlet 132 from the gas port 122 to the intake port 138 of the fluid outlet 132, and a lower, liquid channel 136 from the liquid port 124 to the intake port 138 of the fluid outlet 132. Both channels 134 and 136 are in fluid communication with the treatment chamber 1312 via the gas port 122 and liquid port 124, respectively. The gas and liquid channels 134 and 136 converge at the intake port 138 of the fluid outlet 132, and are in fluid communication therewith. The intake port 138 of the fluid outlet 132 defines a freeboard interface 142. Other aspects of the desanding device 800 are similar to the desanding devices described above.

In above embodiments, the discharge end 148 of the fluid inlet 118 is above the freeboard interface 142 defined by the intake port 138 of the fluid outlet 132. In an alternative embodiment, the discharge end 148 of the fluid inlet 118 is below the freeboard interface 142. The disadvantage of the desanding device in this embodiment is that, the liquid level may grow above the discharge end 148 of the fluid inlet 118, and when it occurs, the fluid stream is injected into the treatment chamber under the liquid surface, and may cause greater turbulence than injecting the fluid stream above the liquid surface.

Those skilled in the art appreciate that the particulate collection structure 104 may alternatively comprise different components. For example, in an alternative embodiment, the particulate collection structure 104 may be a sand sump having a normally-closed valve, a blind, or quick access port or the like, coupled to the particulate drain 120, which is closed when the desanding device is in operation, and is open for cleaning out particulates accumulated in the accumulator portion 146.

In an alternative embodiment, the fluid inlet comprises a nozzle, such as a replaceable nozzle as set forth in Applicant's Canadian Patent Number 2,535,215 issued May 8, 2008, the content of which is incorporated herein by reference in its entirety.

In another embodiment, the fluid inlet 118 comprises a nozzle having a horizontally oriented injection end for connecting to a wellhead, and an inclined discharge end 148 oriented in a direction generally along the inclined axis X-X, such as a nozzle as set forth in FIG. 5.

In some other embodiments, an inlet nozzle having a diverting wall at the discharge end 148 may be used. The detail of such inlet nozzle is disclosed in Applicant's Canadian Patent Application Number 2,836,437, filed in Dec. 16, 2013, the content of which is incorporated herein by reference in its entirety.

The desanding devices described in this disclosure generally exploit the effect of gravity to separate particulates from the multiphase fluid stream injected into a vessel having a limited size, which provide significant advantage for use in oil and gas sites that offer limited operational space.

In above embodiments, the multiple-phase fluid stream comprises liquid L. In some alternative embodiments, the multiple-phase fluid stream does not comprise liquid L. In these embodiment, both the gas channel 134 and the liquid channel 136 are used for directing gas G from the vessel to the fluid outlet 132.

In above embodiments, the gas and liquid channels are physically separated from the treatment chamber by one or more walls. In some embodiments described above, the gas and liquid channels are external to the vessel while in other embodiments described above, the gas and liquid channels are received in the vessel. In embodiments that the gas and liquid channels 134 and 136 are within the vessel, e.g., in embodiments of FIGS. 12-14, 15, and 17-24, it is preferable to design the desanding device in such a way that the treatment chamber has a cross-sectional area much larger than the cross-sectional areas of the gas and liquid channels, respectively. The advantage of such a design is that, for a vessel with a limited cross-sectional area, smaller cross-sectional areas of the gas and liquid channels result in a larger cross-sectional area of the treatment chamber, which means that the fluid stream injected into the treatment chamber experiences greater velocity slow-down, giving rise to better desanding result. Moreover, with smaller cross-sectional areas of the gas and liquid channels, more interior space of the vessel is used as the treatment chamber, improving the desanding capacity.

Those skilled in the art appreciate that, in some alternative embodiments, one of the gas and liquid channels may be outside the vessel and the other of the gas and liquid channels may be received in the vessel.

Those skilled in the art appreciate that, the desanding device may be made of suitable material, such as steel or the like, with specifications satisfying relevant safety code requirement. Also, in embodiments that the desanding device is used for removing particulates from high-pressure fluid streams, the shape of the vessel may also be modified to meet relevant safety requirements. For example, the upper and lower ends of the vessel may be of a semi-spherical shape to provide higher pressure resistance.

The embodiments of the invention for which an exclusive property or privilege is claimed are defined as follows:

1. A desanding device for removing at least particulates from a multiple-phase fluid stream containing at least gas, liquid and entrained particulates, the desanding device comprising:

a vessel forming a treatment chamber, the treatment chamber having a fluid inlet for receiving the fluid stream adjacent an upper portion thereof and collecting particulates at a lower portion thereof, a top wall and bottom wall, said bottom wall having a non-zero angle of inclination with respect to a horizontal plane, and a recovery chamber comprising a conduit fluidly connected to the treatment chamber, the conduit having
a first upper port formed through the conduit and in fluid communication with the upper portion of the treatment chamber for receiving gas therefrom,
a second lower port formed through the conduit and in fluid communication with a lower portion of treatment chamber for receiving liquid therefrom, the second lower port at an elevation below the first port, and
a fluid outlet, at an elevation intermediate the first upper and second lower ports and at an elevation lower than the fluid inlet, for discharging a particulate-free gas and a particulate-free liquid.

2. The desanding device of claim 1 wherein the recovery chamber is external to the vessel.

3. The desanding device of claim 1 wherein the conduit is located within the vessel.

4. The desanding device of claim 1 wherein the treatment chamber further comprises a particulate drain for removing particulates from the lower portion of the treatment chamber.

5. The desanding device of claim 1 wherein a cross-sectional area of the recovery chamber is much smaller than a cross-sectional area of the treatment chamber.

6. The desanding device of claim 1 wherein a liquid interface is formed in the recovery chamber and the treatment chamber at about the elevation of the fluid outlet.

7. The desanding device of claim 1 wherein the treatment chamber further comprises a flow barrier between the fluid inlet and the first upper port for directing the fluid stream thereabout.

8. The desanding device of claim 1 wherein a first portion of the recovery chamber is external to the vessel and fluidly connected to the treatment chamber within the vessel at the first upper port and a second portion of the recovery chamber is located within the vessel and fluidly connected to the treatment chamber within the vessel at the second lower port.

9. The desanding device of claim 1 wherein the treatment chamber further comprises a particulate drain for removing particulate from the lower portion of said treatment chamber, the particulate drain comprising a sand accumulation chamber sandwiched between an inlet valve and a discharge valve for forming an airlock.

10. The desanding device of claim 9 further comprising a particulate detector to detect particulate accumulation in the sand accumulation chamber through the inlet valve and to periodically open and close the particulate drain.

11. The desanding device of claim 9 wherein the inlet and discharge valves are controlled automatically with a timer or a particulate detector to periodically open and close the particulate drain.

12. The desanding device of claim 1 wherein the conduit is external to the vessel and fluidly connected to the treatment chamber within the vessel at the first upper port and at the second lower port.

13. The desanding device of claim 12 wherein the conduit comprises a vertically oriented conduit portion extending upwardly from the second lower port and to the fluid outlet.

14. The desanding device of claim 1 wherein the treatment chamber has a bottom wall at an angle of between about 25 and about 90°.

15. The desanding device of claim 1 wherein the treatment chamber has a bottom wall at or greater than an angle of repose of the particulates accumulated therein.

16. The desanding device of claim 1 wherein the conduit comprises a baffle in the vessel that divides the vessel into a treatment chamber and the recovery chamber, the first upper port and the second lower port formed through the baffle.

17. The desanding device of claim 16 wherein the fluid outlet extends downwardly into the recovery chamber to an elevation intermediate the first upper port and the second lower port.

18. The desanding device of claim 1, wherein the fluid inlet extends adjacent to or along the bottom wall of the vessel and the second lower port is along the top wall.

* * * * *